United States Patent
Bondaryk et al.

(10) Patent No.: US 11,008,033 B2
(45) Date of Patent: May 18, 2021

(54) HITCH-MOUNTED ROBOT SYSTEMS

(71) Applicant: Toyota Research Institute, Inc., Los Altos, CA (US)

(72) Inventors: Joseph Bondaryk, Brookline, MA (US); Eric Krotkov, Cambridge, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 512 days.

(21) Appl. No.: 15/881,075

(22) Filed: Jan. 26, 2018

(65) Prior Publication Data
US 2019/0232992 A1 Aug. 1, 2019

(51) Int. Cl.
| | |
|---|---|
| *B62B 5/00* | (2006.01) |
| *B60D 1/36* | (2006.01) |
| *B60D 1/46* | (2006.01) |
| *B62B 3/02* | (2006.01) |
| *G05D 1/02* | (2020.01) |
| *B62B 3/00* | (2006.01) |

(52) U.S. Cl.
CPC .............. *B62B 5/0069* (2013.01); *B60D 1/36* (2013.01); *B60D 1/465* (2013.01); *B62B 3/005* (2013.01); *B62B 3/02* (2013.01); *B62B 5/0033* (2013.01); *B62B 5/0079* (2013.01); *G05D 1/0212* (2013.01); *G05D 1/0225* (2013.01); *G05D 1/0246* (2013.01); *G05D 2201/02* (2013.01)

(58) Field of Classification Search
CPC  B62B 5/069; B62B 3/005; B62B 3/02; B62B 5/0033; B62B 5/0079; B60D 1/36; B60D 1/465; G05D 1/0212; G05D 1/0225; G05D 1/0246

USPC ........................................................ 180/14.1
See application file for complete search history.

(56) References Cited

U.S. PATENT DOCUMENTS

| | | | |
|---|---|---|---|
| 5,899,285 A * | 5/1999 | Curbelo | B62B 5/0026 |
| | | | 180/65.1 |
| 6,409,186 B2 | 6/2002 | Bennington | |
| 7,380,803 B2 | 6/2008 | Thomas | |
| 7,648,068 B2 | 1/2010 | Silverbrook et al. | |
| 9,216,698 B2 * | 12/2015 | Rhodes | B60R 9/065 |
| 9,534,906 B2 | 1/2017 | High et al. | |
| 10,065,566 B1 * | 9/2018 | Harbaugh | B62B 5/0003 |
| 10,279,752 B2 * | 5/2019 | Bromfield | B60R 9/065 |

(Continued)

FOREIGN PATENT DOCUMENTS

CN          10344876 A       12/2013

OTHER PUBLICATIONS

"CompaRob: The Shopping Cart Assistance Robot" URL: http://journals.sagepub.com/doi/pdf/10.1155/2016/4781280.

(Continued)

*Primary Examiner* — Jacob D Knutson
(74) *Attorney, Agent, or Firm* — Dinsmore & Shohl LLP

(57) ABSTRACT

Hitch mounted robot systems and methods for operating the same are disclosed. A hitch mounted robot system includes a coupling mechanism that is insertable into a hitch receiver on a vehicle and a height adjustment mechanism coupled to the coupling mechanism. The height adjustment mechanism automatically moves the coupling mechanism in a system vertical direction to lift the hitch mounted robot system off a ground surface when the coupling mechanism is inserted into the hitch receiver.

19 Claims, 14 Drawing Sheets

(56) References Cited

U.S. PATENT DOCUMENTS

| | | | | |
|---|---|---|---|---|
| 2006/0255560 A1* | 11/2006 | Dietz | ............... | B60D 1/36 |
| | | | | 280/477 |
| 2007/0126192 A1* | 6/2007 | Thomas | ............... | B62B 3/1416 |
| | | | | 280/33.992 |
| 2008/0100076 A1* | 5/2008 | Potts | ............... | B60R 9/06 |
| | | | | 296/3 |
| 2013/0102162 A1* | 4/2013 | Holmes | ............... | B60D 1/64 |
| | | | | 439/34 |
| 2017/0169414 A1* | 6/2017 | Suzuki | ............... | G06Q 20/20 |

OTHER PUBLICATIONS

"Here Come the Robot Shopping Carts" http://www.roboticstrends.com/article/here_come_the_robot_shopping_carts/products.

"Vans & Robots: How delivery robots and Sprinter make logistics easier" URL: http//www.myvan.com/work/service/Mercedes-benz-sprintervans-robots-starship-technology/.

* cited by examiner

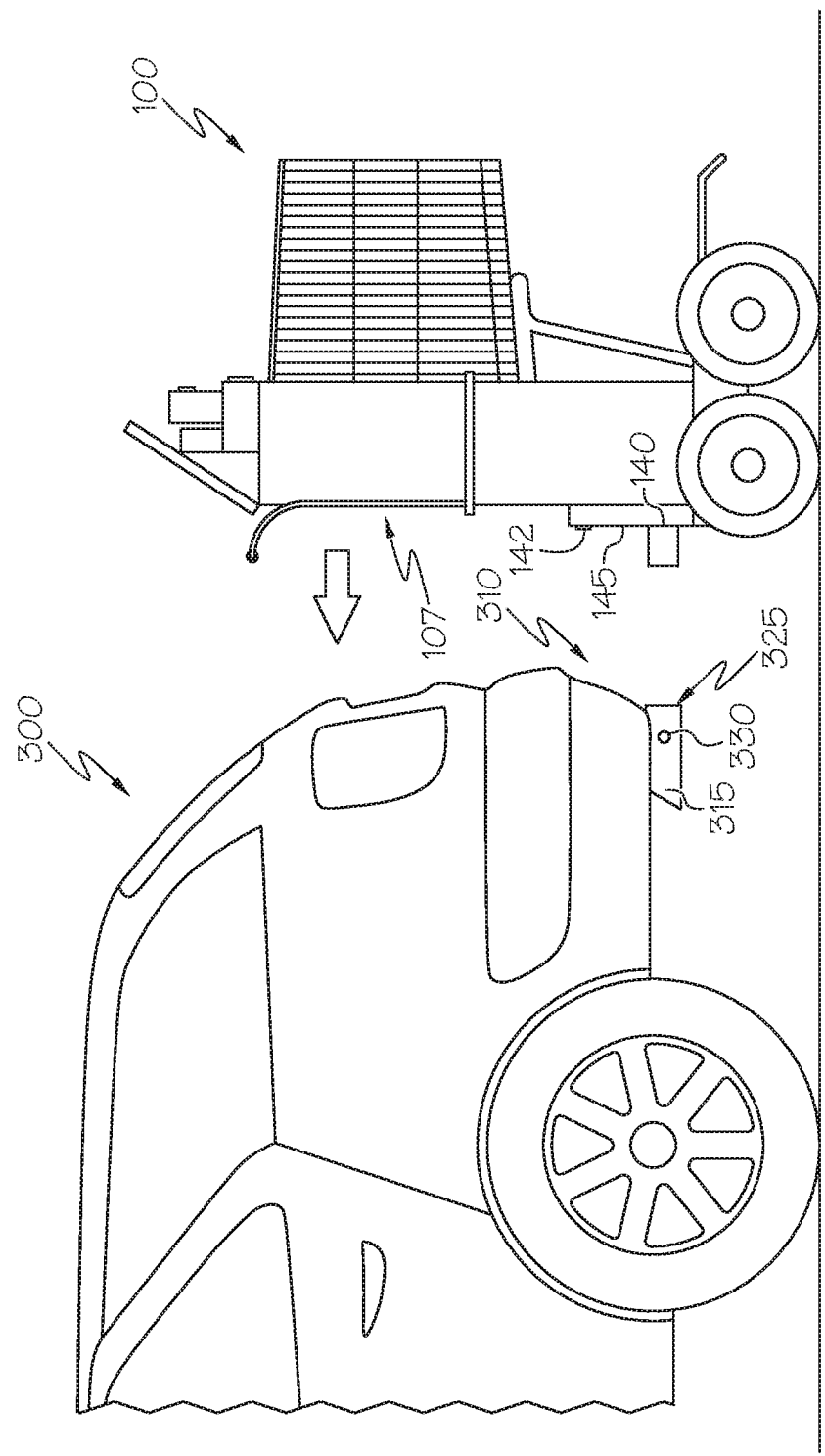

HITCH-MOUNTED ROBOT SYSTEMS

BACKGROUND

Field

The present specification generally relates to portable robot systems and, more particularly, to portable robot systems that can be mounted to a vehicle hitch.

Technical Background

Currently, certain people may struggle with transporting items. For example, people such as elderly or reduced mobility people may struggle with the tasks required to shop for items, bring the purchased items back to their homes, and put the purchased items away. That is, people may be required to complete a number of tasks that can be taxing, such as placing items into a shopping cart, removing the items for purchasing, returning the items to the shopping cart for a trip to the person's vehicle, moving the items from the shopping cart to the vehicle, moving the items from the vehicle to the person's home, and putting the items away in storage areas. In another example, with the recent prevalence in online shopping and items that are shipped directly to a user's home, the so-called "last mile" of delivery can be difficult to complete in a timely manner by postage and package delivery personnel.

Existing robot systems that may address some of the above-mentioned issues are not readily transportable and/or move too slowly to be used as a standalone system that moves over larger distances. Accordingly, such robot systems may not be usable to carry items for a user over large distances or usable in "last mile" situations to quickly deliver items.

SUMMARY

In one embodiment, a hitch mounted robot system includes a coupling mechanism that is insertable into a hitch receiver on a vehicle and a height adjustment mechanism coupled to the coupling mechanism. The height adjustment mechanism automatically moves the coupling mechanism in a system vertical direction to lift the hitch mounted robot system off a ground surface when the coupling mechanism is inserted into the hitch receiver.

In another embodiment, a hitch mounted robot system mounted to a vehicle includes a coupling mechanism, a height adjustment mechanism coupled to the coupling mechanism, a drive mechanism, a processing device communicatively coupled to the height adjustment mechanism and the drive mechanism, and a non-transitory, processor-readable storage medium communicatively coupled to the processing device. The non-transitory, processor-readable storage medium includes one or more programming instructions stored thereon that, when executed by the processing device, cause the processing device to determine coordinates of a trailer hitch receiver relative to the coupling mechanism, generate a trajectory plan that corresponds to one or more movements for guiding the coupling mechanism into the trailer hitch receiver, transmit one or more movement commands to the drive mechanism, the one or more movement commands corresponding to the trajectory plan to guide the coupling mechanism into the trailer hitch receiver, and when the coupling mechanism is inserted into the trailer hitch receiver, transmit a signal to the height adjustment mechanism to cause the height adjustment mechanism to raise the coupling mechanism to lift the hitch mounted robot system off a ground surface.

In yet another embodiment, a hitch mounted robot system mounted to a vehicle includes a coupling mechanism, a height adjustment mechanism coupled to the coupling mechanism, a drive mechanism, a processing device communicatively coupled to the height adjustment mechanism and the drive mechanism, and a non-transitory, processor-readable storage medium communicatively coupled to the processing device. The non-transitory, processor-readable storage medium including one or more programming instructions stored thereon that, when executed by the processing device, cause the processing device to transmit a command to the height adjustment mechanism to cause the height adjustment mechanism to lower the coupling mechanism such that the hitch mounted robot system contacts a ground surface and transmit one or more signals to the drive mechanism to cause the drive mechanism to drive one or more wheels in a direction away from the vehicle such that the hitch mounted robot system decouples from the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 4A schematically depicts a side view of an illustrative hitch mounted robot system approaching a vehicle hitch according to one or more embodiments shown and described herein;

DETAILED DESCRIPTION

The present disclosure relates generally to robot systems that are easily transportable over larger distances by using a vehicle, thereby increasing the mobility and the operating range of the robot systems relative to other robot systems. The robot systems described herein are capable of being mounted to standard and/or customized trailer hitches on vehicles such that the robot systems can be transported by the vehicles. The robot systems are not limited by this disclosure, and may generally be any robot systems, particularly those that would be useful to transport, such as robot systems that assist humans with everyday tasks, robot systems that provide last mile delivery services, and/or the like. The robot systems described herein generally include various components that couple/decouple the robot systems from a standard vehicle hitch receiver, as well as various components that allow for charging and/or communications via a modified vehicle hitch or a vehicle hitch having a particular communications/power interface.

Although embodiments herein are described in the context of shopping and delivery robots, embodiments are not limited thereto. For example, the robot systems described herein may be used for various healthcare purposes, manufacturing purposes, and/or the like. Other uses should generally be understood and are included within the scope of the present disclosure.

As used herein, the term "hitch mounted robot system" refers to any robot system that is capable of being coupled to or removed from a standard vehicle hitch and/or a modified vehicle hitch that has an integrated communications/power interface. That is, the hitch mounted robot systems described herein are not limited to robot systems that are limited to a particular use, but rather any robot system that has hitch mounted capabilities as described herein. In addition, it should be understood that the hitch mounted robot systems described herein may not be mounted to a vehicle hitch at times; rather, the "hitch mounted" phrasing is merely provided to indicate the capability of being hitch mounted.

As used herein, the term "last mile delivery" refers to the movement of goods from a transportation hub to a final delivery destination, such as a home or a business. The focus of last mile logistics is to get the goods from the hub to the final destination as fast as possible, and may involve more than one mode of delivery. For example, a truck having one or more of the hitch mounted robot system described herein may travel from the transportation hub to an area containing a plurality of final delivery destinations for a plurality of goods. The hitch mounted robot systems described herein may facilitate delivery from the truck to the respective final destinations to increase the speed in which the goods are delivered.

Figure 1A:
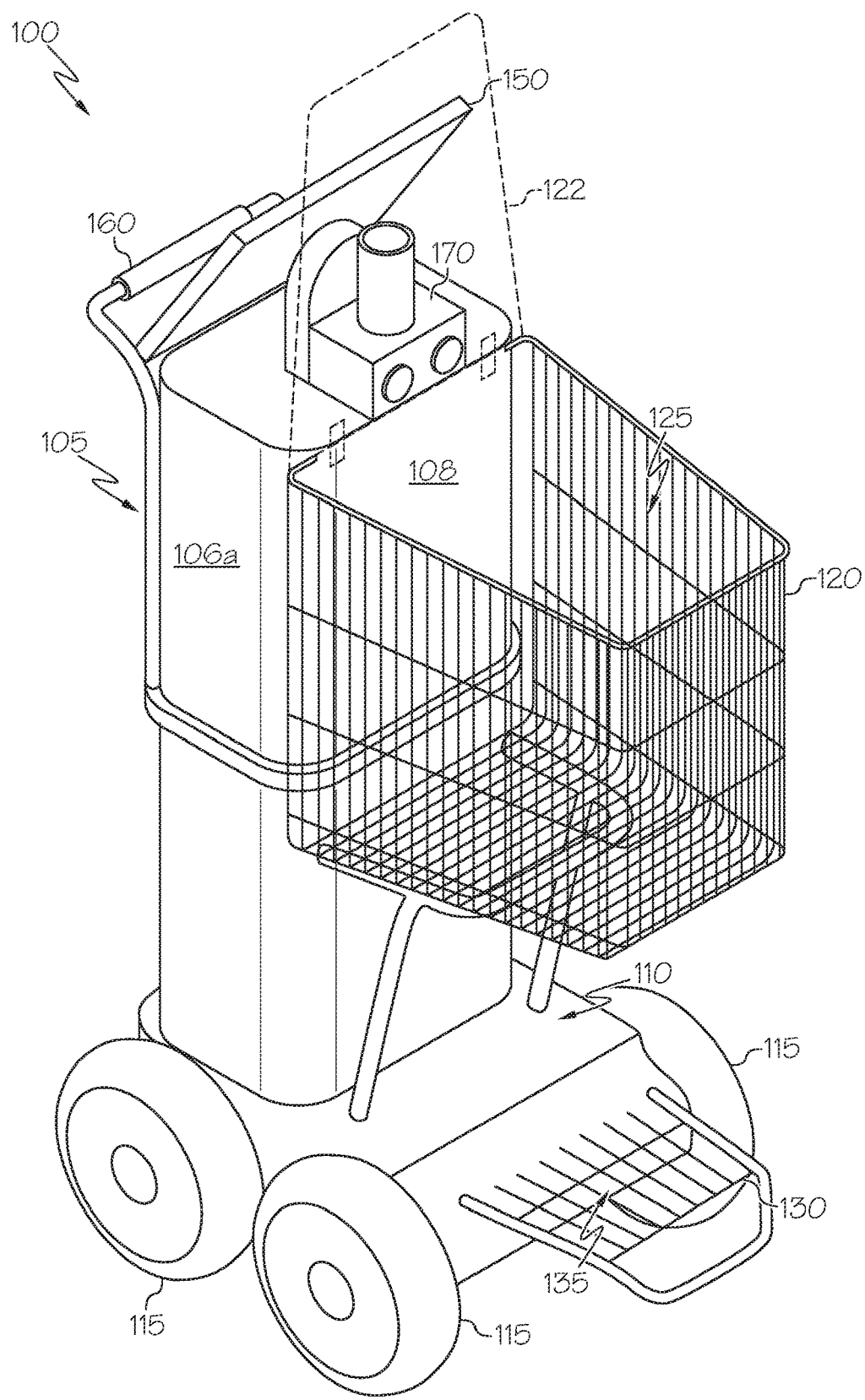
FIG. 1A depicts a perspective view of an illustrative hitch mounted robot system according to one or more embodiments shown and described herein.
Figure 1B:
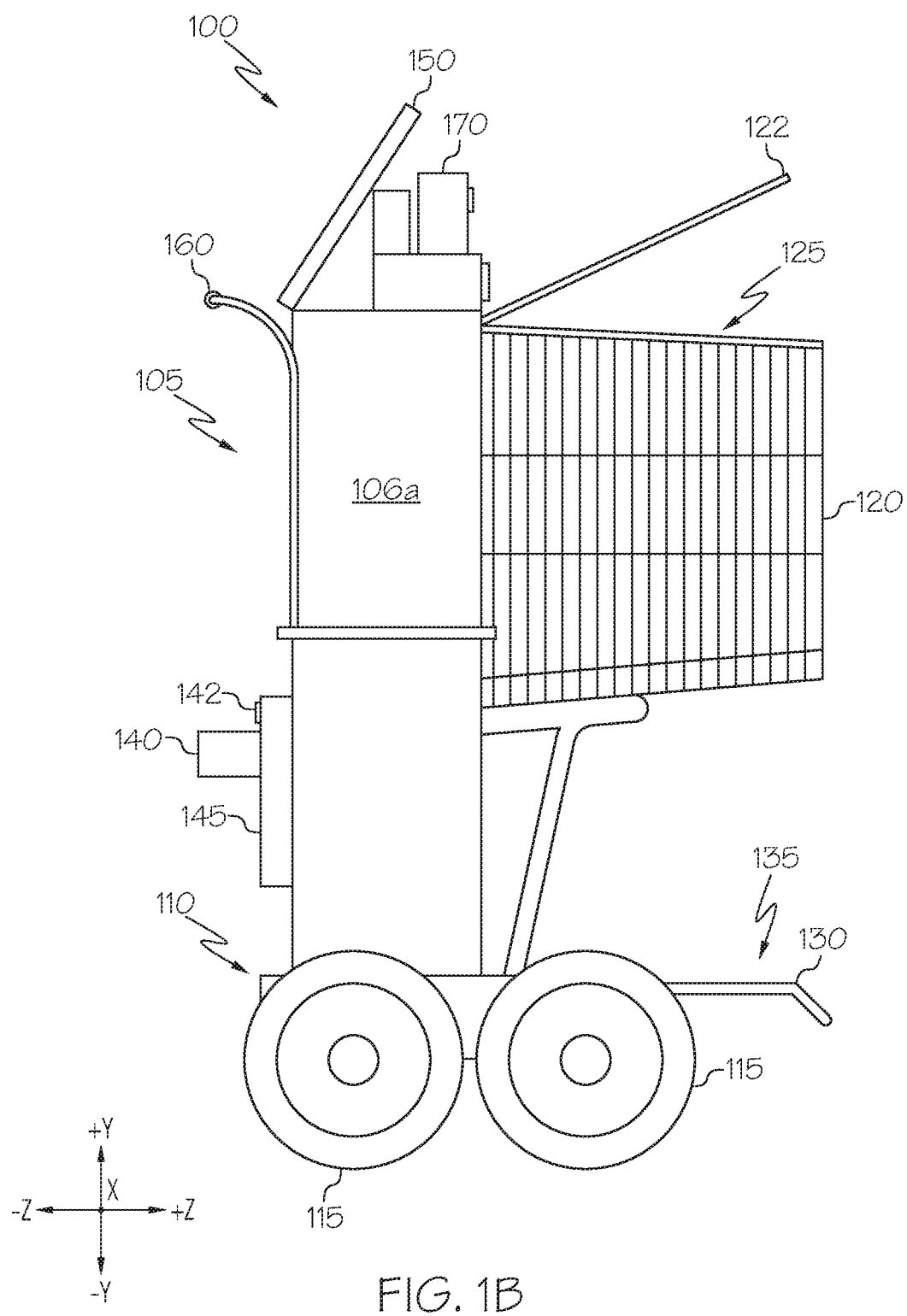
FIG. 1B depicts a side view of an illustrative hitch mounted robot system according to one or more embodiments shown and described herein.
Figure 1C:
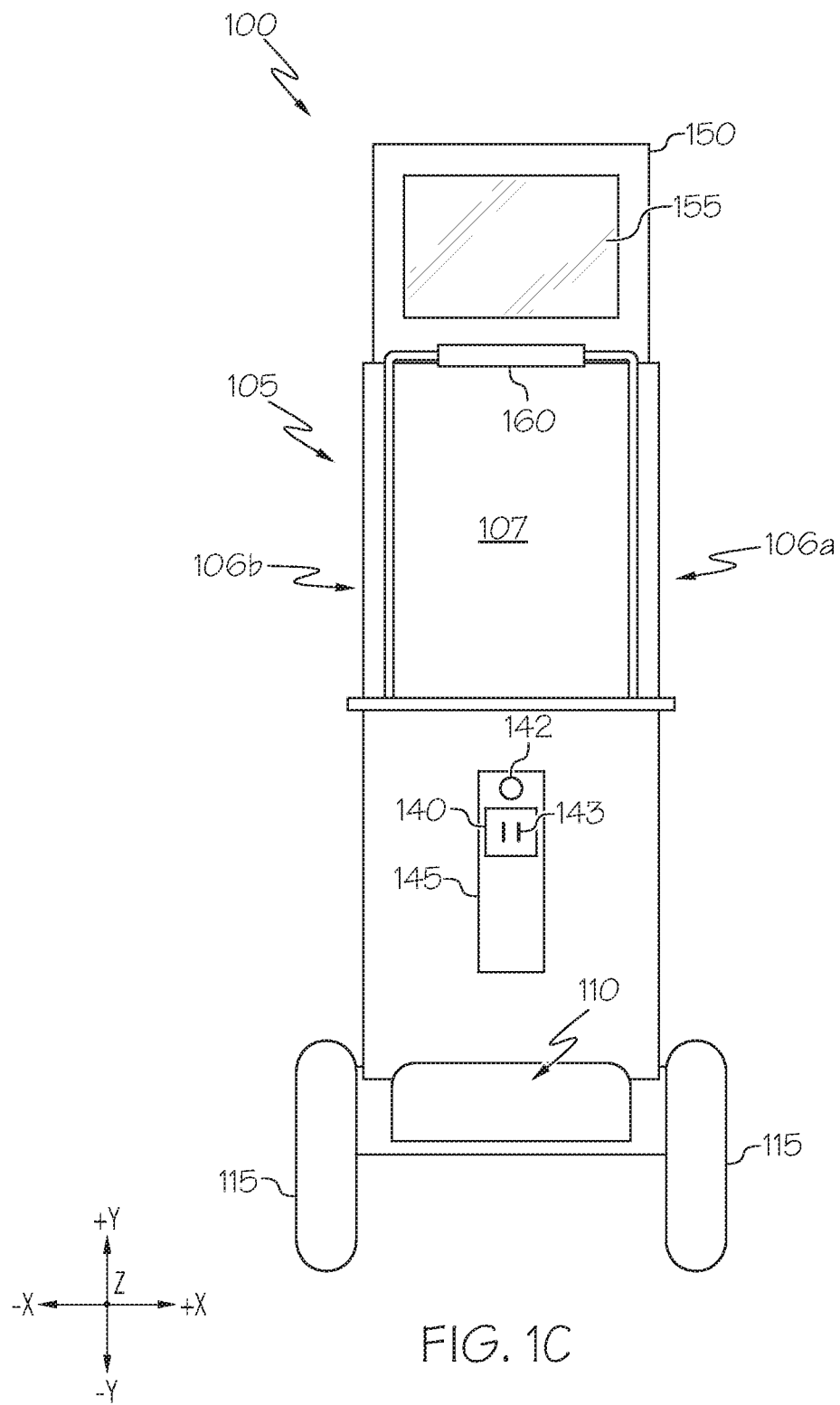
FIG. 1C depicts a rear view of an illustrative hitch mounted robot system according to one or more embodiments shown and described herein.

Referring now to the drawings, FIGS. 1A-C depict various views of an illustrative hitch mounted robot system, generally designated 100, according to an embodiment. The illustrative hitch mounted robot system 100 depicted in FIG. 1A may provide particular use in assisting people with obtaining goods from a store (e.g., groceries from a grocery store) and transporting the goods to an end location (e.g., the person's home), as described in further detail herein. However, it should be appreciated that the hitch mounted robot system 100 is not limited to this use and may be used for other purposes without departing from the scope of the present disclosure. For example, the hitch mounted robot system 100 may be used to provide last mile delivery services, as described in further detail herein. In another example, the hitch mounted robot system 100 may be used in other fields, such as the healthcare field, the manufacturing field, and/or the like.

The hitch mounted robot system 100 generally includes a body 105 supported on a base 110. In some embodiments, the body 105 may have a plurality of surfaces, including, but not limited to, a first side 106a, a second side 106b (FIG. 1C), a back side 107 (FIG. 1C), and a front side 108 (FIG. 1A). The various surfaces may support one or more components of the hitch mounted robot system 100, as described in further detail herein.

Still referring to FIGS. 1A-1C, the base 110 of the hitch mounted robot system 100 may be coupled to one or more mobility components, such as, for example, one or more wheels 115 rotatably coupled to the base 110. In some embodiments, at least one of the one or more wheels 115 may be coupled to a drive mechanism such as a motor, a transmission, and/or the like such that the wheels 115 can be rotated to move the hitch mounted robot system 100 across a surface, as described in greater detail herein. In some embodiments, the wheels 115 may not be coupled to a drive mechanism, but rather the hitch mounted robot system 100 is moved by receiving an external force (e.g., a user pushes or pulls the hitch mounted robot system 100) to cause the wheels 115 to rotate and the hitch mounted robot system 100 to move. In some embodiments, at least one of the wheels 115 may be movable around a plurality of axes such that the wheel is steerable. The wheels 115 are otherwise not limited by the present disclosure and may contain any other features. For example, the wheels 115 may be adapted for moving over varied and/or unpaved terrain, adapted for lifting the hitch mounted robot system 100 up a single step (such as a curb or the like), adapted to move in inclement weather conditions, and/or the like. While FIGS. 1A-1C depict the wheels 115 as the mobility components, it should be appreciated that the present disclosure is not limited to such. For example, the mobility components may be skis, rotors, and/or the like that provide the hitch mounted robot system 100 with an ability to move.

In various embodiments, the hitch mounted robot system 100 may include one or more storage compartments for holding items. For example, the hitch mounted robot system 100 may have one or more storage compartments for holding items that are purchased at a store, holding items as the hitch mounted robot system 100 is transported via a trailer hitch, securing items, and/or the like. For example, as shown in FIGS. 1A and 1B, the hitch mounted robot system 100 may have an upper storage compartment 120 and/or a lower storage compartment 130. The upper storage compartment 120 may extend from the front side 108 (FIG. 1A) and have a cavity 125 for holding items. Similarly, the lower storage compartment 130 may extend from the front side 108 (FIG. 1A) and/or the base 110 and may also have a cavity 135 for holding items. The upper storage compartment 120 and the lower storage compartment 130 are generally not limited by this disclosure, and may be any component having the cavity 125 for holding items. As such, both the upper storage compartment 120 and the lower storage compartment 130 may have any number of sides, walls, may have any dimensions, may be constructed of any material, may include shelves, may include racks, and/or the like.

In some embodiments, the upper storage compartment 120 and/or the lower storage compartment 130 may include a removable cover 122 or the like that at least partially encloses the contents within the respective cavities 125, 135. For example, as shown in FIGS. 1A and 1B, the upper storage compartment 120 may have an opening to the cavity 125 that is covered by the removable cover 122 to protect the contents within the cavity 125 from damage, to avoid theft of the contents within the cavity 125, and/or to prevent the contents from spilling out of the cavity 125 when the hitch mounted robot system 100 is transported as described herein. While FIGS. 1A and 1B depict the removable cover 122 as being rotatably coupled (e.g., via a hinge) to the upper storage compartment 120, this is merely an example. That is, in some embodiments, the removable cover 122 may be wound on a roll when not used (i.e., in a retracted state) and unwound/extracted to cover the upper storage compartment 120 and/or the lower storage compartment 130 (i.e., in a deployed state). Movement between retracted and deployed states may be completed manually or automatically. In yet other embodiments, the removable cover 122 may be collapsed within itself and/or one or more other components of the hitch mounted robot system 100 and/or folded onto itself when in a retracted state and may slide and/or unfold to cover the upper storage compartment 120 and/or the lower storage compartment 130 when in a deployed state. In some embodiments, the removable cover 122 may be completely detachable from the various component of the hitch mounted robot system 100 such that the removable cover 122 may be stored separately from the hitch mounted robot system 100. In some embodiments, the removable cover 122 may be a tarp or the like that a user secures over the upper storage compartment 120 and/or the lower storage compartment 130 (e.g., via hooks, clips, snaps, and/or the like) when the user desires to secure items therein, and removes when access to the respective cavities 125, 135 thereof is desired. In some embodiments, the removable cover 122 may be lockable to securely hold the contents within the upper storage compartment 120 and/or the lower storage compartment 130.

Referring again to FIGS. 1A-1C, the hitch mounted robot system 100 may include various components that allow the hitch mounted robot system 100 to be manually pushed/pulled around a space, be semi-automatically driven by a user, and/or have autonomous movement capabilities that allow the hitch mounted robot system 100 to move around a space with little or no input from a user. That is, the hitch mounted robot system 100 may include components that allow for operation in a full manual mode, a manual assist mode, a semi-autonomous mode, and/or an autonomous mode, as described in greater detail herein.

For example, in some embodiments, the hitch mounted robot system 100 may include one or more handles 160 that are positioned and arranged for a user to grasp. That is, a user may manually push/pull the hitch mounted robot system 100, turn the hitch mounted robot system 100, and/or the like by applying a force to at least the one or more handles 160. As such, the one or more handles 160 may generally be located anywhere on the hitch mounted robot system 100, particularly locations that are accessible by a user. For example, the one or more handles 160 may be located at elbow level or below for an average human such that the one or more handles 160 can be comfortably grasped by the user. In addition, the one or more handles 160 may be coupled to the back side 107 of the body 105, as depicted in FIGS. 1A-1C, as well as other locations not depicted, such as, for example, coupled to the upper storage compartment 120, coupled to the first side 106a of the body 105, and/or coupled to the second side 106b of the body 105. In some embodiments, the one or more handles 160 may be integrated with one or more portions of the hitch mounted robot system 100 at or near the base 110 such that a user may use his or her feet to contact the one or more handles 160 to move the hitch mounted robot system 100. In some embodiments, the one or more handles 160 may have one or more user interface hardware components (not shown) integrated therein or coupled thereto, such as buttons, switches, joysticks, and/or the like that allow a user to navigate a user interface, to provide inputs for moving the hitch mounted robot system 100 (e.g., to automatically or semi-automatically drive the hitch mounted robot system 100), to lock one or more portions of the hitch mounted robot system 100, to provide commands that allow the hitch mounted robot system 100 to autonomously move, and/or the like. In some embodiments, the one or more user interface hardware components may be able to decouple from the one or more handles 160 such that a user may carry the one or more user interface hardware components separately from the hitch mounted robot system 100 and use the one or more user interface hardware components to remotely control one or more aspects of the hitch mounted robot system 100 and/or components thereof.

In another example, the hitch mounted robot system 100 may include a sensor array 170 mounted thereto, as shown in FIGS. 1A and 1B. The sensor array 170 may include various components for assisting a user of the hitch mounted robot system 100 in purchasing items, cataloging items that are placed in the upper storage compartment 120 and/or the lower storage compartment 130, securing the hitch mounted robot system 100 and/or items within the upper storage compartment 120 and/or the lower storage compartment 130, sensing whether a user is in the vicinity of the hitch mounted robot system 100, sensing an environment around the hitch mounted robot system 100 for the purposes of autonomous movement of the hitch mounted robot system 100, semi-autonomous movement of the hitch mounted robot system 100, assisted movement of the hitch mounted robot system 100 in a manual assist mode, and/or the like. The various components of the sensor array 170 are not limited by the present disclosure, and may generally be any components that provide the functionality described herein. For example, the sensor array 170 may include one or more imaging devices, including cameras, optical sensors, ranging systems, time of flight (TOF) sensors, proximity sensing systems, laser emitting devices, and/or the like. Such systems should generally be understood and are not described further herein.

Referring to FIGS. 1B and 1C, the hitch mounted robot system 100 may have one or more components for coupling the hitch mounted robot system 100 to a vehicle hitch, as described in further detail herein. Illustrative components include, but are not limited to, a coupling mechanism 140 that is insertable into a vehicle hitch receiver, a height adjustment mechanism 145 coupled to the coupling mechanism 140, and a sensing device 142. Other components that may be used to facilitate coupling as described herein should be understood and are included within the scope of the present disclosure.

The coupling mechanism 140 may generally be shaped and sized so as to fit into a trailer hitch receiver, as described in greater detail herein with respect to FIGS. 3A-3B and 4A-4C. Still referring to FIGS. 1B and 1C, the coupling mechanism 140 may include one or more communications connectors 143 integrated therein or coupled thereto in some embodiments. Such communications connectors 143 may facilitate electronic communication between the hitch mounted robot system 100 and the vehicle to which the hitch mounted robot system 100 is coupled (e.g., establish a communications link) and/or to supply electric power to the hitch mounted robot system 100 (e.g., establish an electrical power link), as described in greater detail herein. It should be understood that the communications connectors 143 may not be present in some embodiments, or may be located in another location that is separate from the coupling mechanism 140 in some embodiments.

In some embodiments, the coupling mechanism 140 may be extendible and retractable such that the coupling mechanism can extend or retract from the body 105 (i.e., along the z-axis of the coordinate axes of FIG. 1B). For example, the coupling mechanism 140 may be a telescoping device that moves from a collapsed position whereby at least one portion of the coupling mechanism 140 is nested inside another portion of the coupling mechanism 140 to an extended position whereby the at least one portion is slid out of the other portion (i.e., generally in the −z direction of the coordinate axes of FIG. 1B) and vice versa to return from the extended position to the collapsed position (i.e., generally in the +z direction of the coordinate axes of FIG. 1B).

Figure 4B:
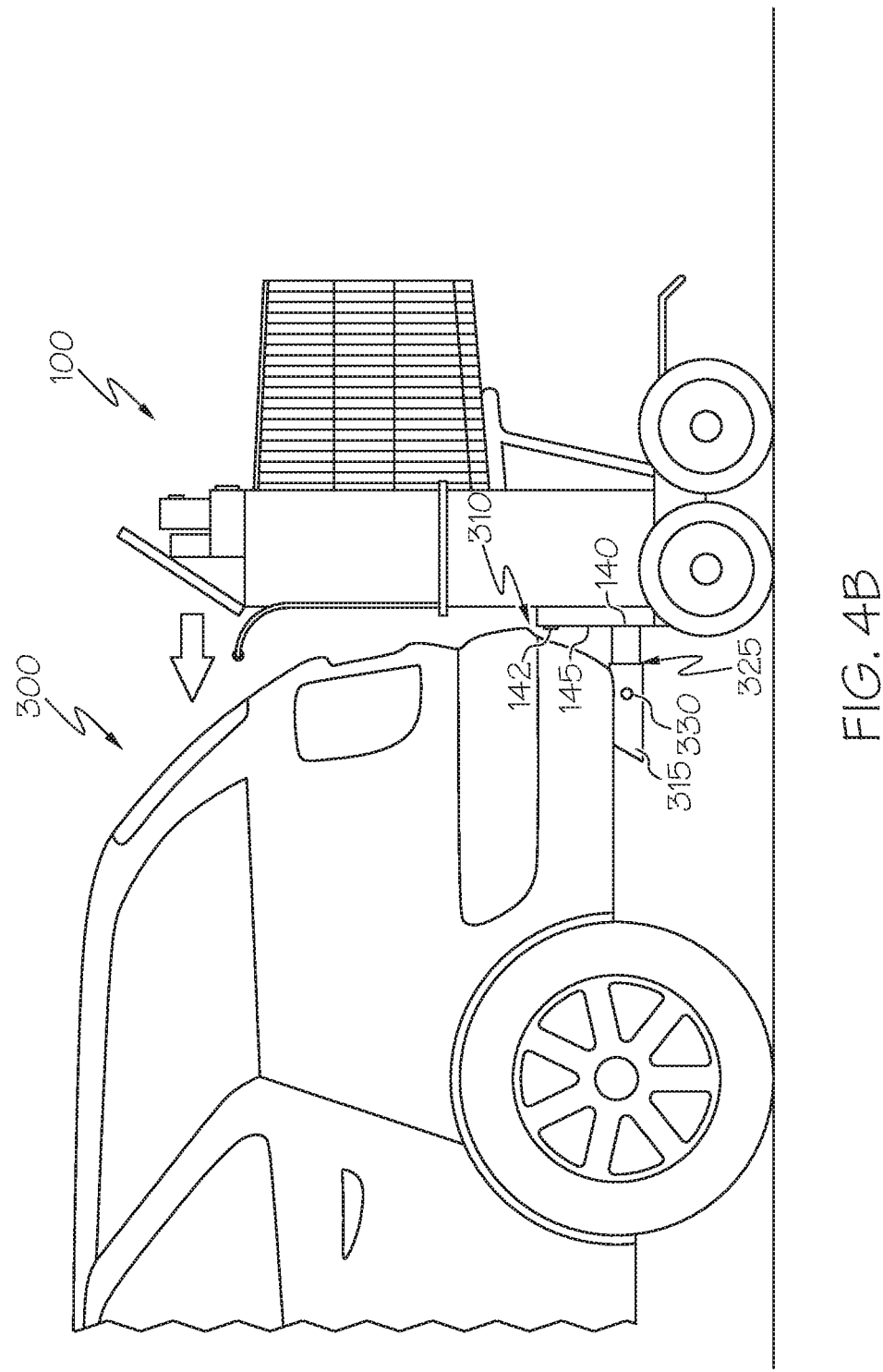
FIG. 4B schematically depicts a side view of an illustrative hitch mounted robot system coupling to a vehicle hitch according to one or more embodiments shown and described herein.
Figure 4C:
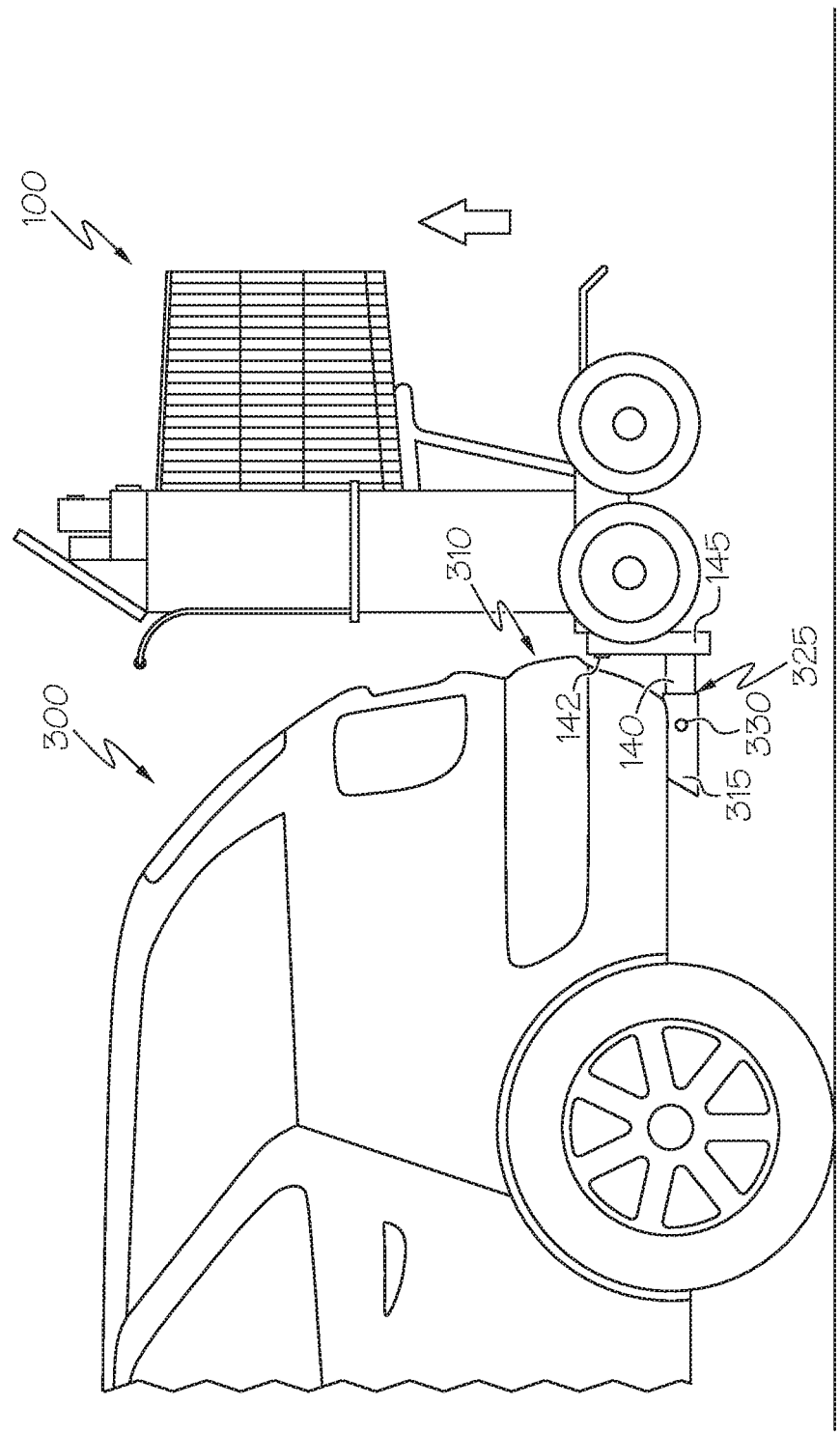
FIG. 4C schematically depicts a side view of an illustrative hitch mounted robot system raising on a vehicle hitch according to one or more embodiments shown and described herein.

The height adjustment mechanism 145 may be a mechanism that adjusts the height of the coupling mechanism 140 with respect to the remainder of the hitch mounted robot system 100, which allows the hitch mounted robot system 100 to be lifted off the ground for transport, as described in greater detail herein with respect to FIGS. 4A-4C. Still referring to FIGS. 1B and 1C, the height adjustment mechanism 145 may generally be any device or mechanism that is capable of automatically driving the hitch mounted robot system 100 in an upwards or downwards motion in a system vertical direction (i.e., along the y axis of the coordinate axes of FIGS. 1B and 1C) to lift the hitch mounted robot system 100 off the ground surface/place the hitch mounted robot system 100 on the ground surface. In addition, the height adjustment mechanism 145 may further be any device or mechanism that is capable of supporting the weight of the hitch mounted robot system 100 when driving. Accordingly, the height adjustment mechanism 145 may include, but is not limited to, a chain drive mechanism, a belt drive mechanism, a hydraulic lift, a pneumatic lift, a linear drive motor, a lead screw, a plurality of mechanical linkages (e.g., a scissor lift mechanism), a ribbon lift (i.e., a zip lift), and/or the like. Other means of driving the movement of the coupling mechanism 140 as described herein are contemplated and included within the scope of the present disclosure.

The sensing device 142 may be one or more sensors (including, but not limited to, a camera, an infrared sensor, and/or the like) that sense an area adjacent to the coupling mechanism 140 and provide data corresponding to the area adjacent to the coupling mechanism 140. The data may then be used to guide the hitch mounted robot system 100 towards the vehicle in an appropriate manner and couple the coupling mechanism 140 to the vehicle hitch receiver, as described in greater detail herein.

Referring again to FIGS. 1A-1C, in various embodiments, the hitch mounted robot system 100 may include a user interface device 150 having a display 155 (e.g., a touch screen display). For example, as shown in FIGS. 1A-1C, the user interface device 150 may be coupled to an upper portion of the body 105 of the hitch mounted robot system 100. However, it should be understood that such a location is merely illustrative and the user interface device 150 may be coupled to other portions of the hitch mounted robot system 100 or may be a separate component that is not coupled to the hitch mounted robot system 100 without departing from the scope of the present disclosure. The user interface device 150 may generally provide one or more user-facing functions, including, but not limited to, providing the user with controls for controlling movement of the hitch mounted robot system 100, providing the user with controls for controlling settings of the hitch mounted robot system 100, providing the user with a purchase interface such that the user can scan a barcode or otherwise identify items to the user interface device 150 before placing such items in the upper storage compartment 120 and/or the lower storage compartment 130 and for purchasing the items, providing the user with controls for docking the hitch mounted robot system 100 to a vehicle hitch as described herein, providing the user with controls for securing the hitch mounted robot system 100, providing controls for extending or retracting the removable cover 122, and/or the like. It should be understood that the user interface device 150 may provide other functionality not specifically described herein without departing from the scope of the present disclosure.

Figure 2A:
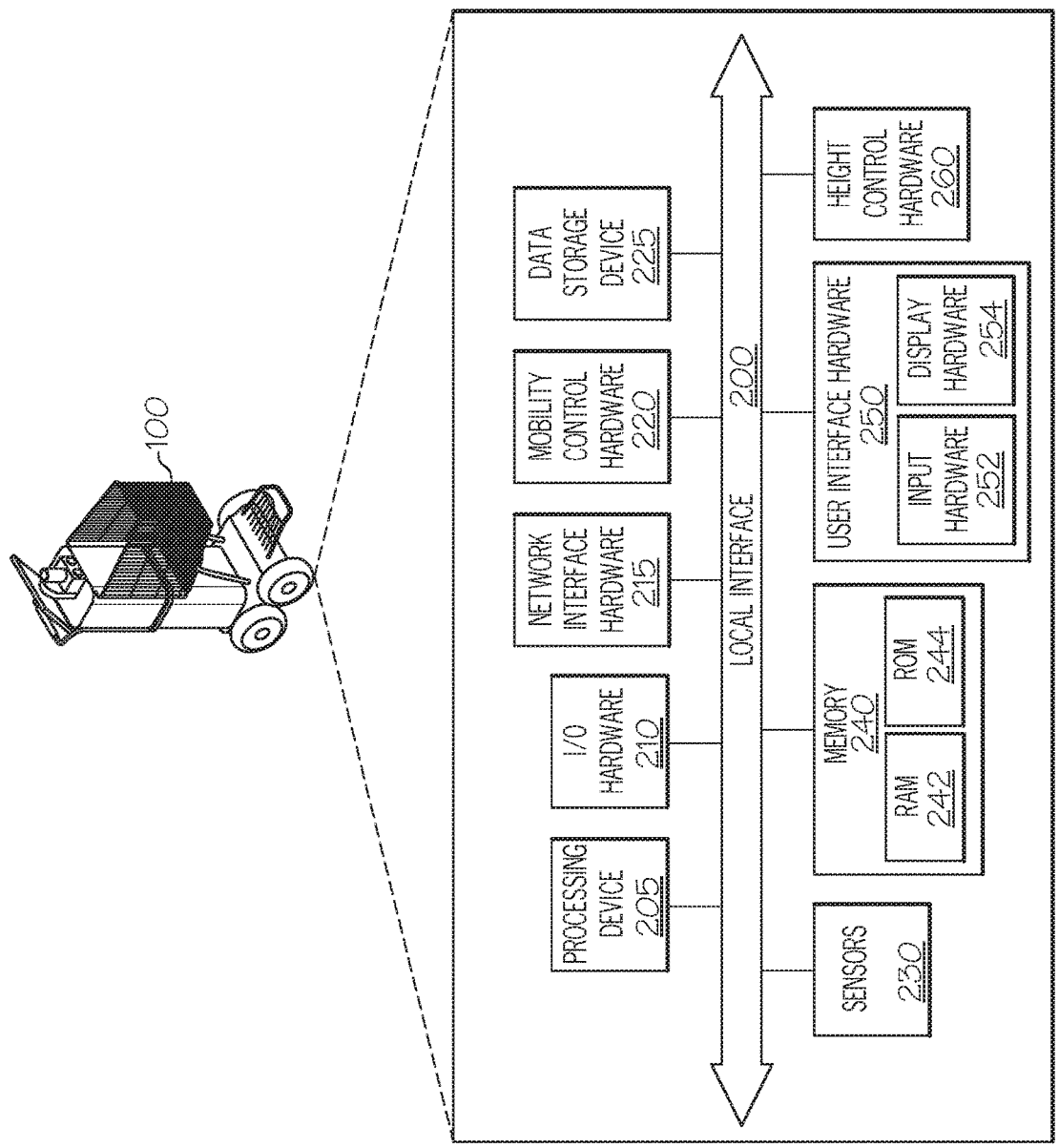
FIG. 2A schematically depicts illustrative hardware components of a hitch mounted robot according to one or more embodiments shown and described herein.

In various embodiments, the user interface device 150 and the display 155 may be integrated with one or more additional hardware components within the hitch mounted robot system 100. FIG. 2A schematically depicts illustrative hardware components of the hitch mounted robot system 100 that may be used to provide the functionality of the hitch mounted robot system 100, as described herein.

The hitch mounted robot system 100 may have a non-transitory computer-readable medium containing one or more programming instructions for completing the various processes described herein, which may be embodied as hardware, software, and/or firmware, according to embodiments shown and described herein. While in some embodiments the various components of the hitch mounted robot system 100 may be configured as a general purpose computer with the requisite hardware, software, and/or firmware, in other embodiments, the various components of the hitch mounted robot system 100 may also be configured as a special purpose computer designed specifically for performing the functionality described herein.

As also illustrated in FIG. 2A, the hitch mounted robot system 100 may include a processing device 205, I/O hardware 210, network interface hardware 215, mobility control hardware 220, a data storage device 225, one or more sensors 230, a non-transitory memory component 240, user interface hardware 250, and height control hardware 260. A local interface 200, such as a bus or the like, may interconnect the various components.

The processing device 205, such as a computer processing unit (CPU), may be the central processing unit of the hitch mounted robot system 100, performing calculations and logic operations to execute a program. The processing device 205, alone or in conjunction with the other components, is an illustrative processing device, computing device, processor, or combination thereof. The processing device 205 may include any processing component configured to receive and execute instructions (such as from the data storage device 225 and/or the memory component 240).

The memory component 240 may be configured as a volatile and/or a nonvolatile computer-readable medium and, as such, may include random access memory 242 (including SRAM, DRAM, and/or other types of random access memory), read only memory (ROM) 244, flash memory, registers, compact discs (CD), digital versatile discs (DVD), and/or other types of storage components. The memory component 240 may include one or more programming instructions thereon that, when executed by the processing device 205, cause the processing device 205 to complete various processes, such as the processes described herein with respect to FIGS. 5-9. Still referring to FIG. 2A, the programming instructions stored on the memory component 240 may be embodied as a plurality of software logic modules, where each logic module provides programming instructions for completing one or more tasks, as described in greater detail below with respect to FIG. 2B.

The network interface hardware 215 may include any wired or wireless networking hardware, such as a modem, LAN port, wireless fidelity (Wi-Fi) card, WiMax card, mobile communications hardware, and/or other hardware for communicating with other networks and/or devices, including the vehicle to which the hitch mounted robot system 100 is coupled, as described herein.

The data storage device 225, which may generally be a storage medium, may contain one or more data repositories for storing data that is received and/or generated. The data storage device 225 may be any physical storage medium, including, but not limited to, a hard disk drive (HDD), memory, removable storage, and/or the like. While the data storage device 225 is depicted as a local device, it should be understood that the data storage device 225 may be a remote storage device, such as, for example, a server computing device, cloud based storage device, or the like. Illustrative data that may be contained within the data storage device 225 is described below with respect to FIG. 2C.

Still referring to FIG. 2A, the I/O hardware 210 may communicate information between the local interface 200 and one or more other components of the hitch mounted robot system 100. For example, the I/O hardware 210 may act as an interface between the various components described with respect to FIG. 2A and other components of the hitch mounted robot system 100, such as one or motors or devices that drive movement and/or steering of the wheels 115 (FIGS. 1A-1C). Still referring to FIG. 2A, the I/O hardware 210 may be utilized to transmit one or more commands to the other components of the hitch mounted robot system 100 in some embodiments.

The user interface hardware 250 may include various hardware components for communicating with a user of the hitch mounted robot system 100, such as, for example, input hardware 252, and display hardware 254. The input hardware 252 may include devices such as, for example, a keyboard, a mouse, a joystick, a camera, a touch screen, a microphone, a wireless remote control device, and/or another device for receiving inputs from a user. The display hardware 254 may include devices such as a video card, a monitor, and/or another device for sending and/or presenting visual data to a user. The display hardware 254 may also incorporate audio output hardware or the like that generates and presents audible data to a user, such as spoken words, tones, and/or the like. It should be understood that the user interface hardware 250 may be integrated with the user interface device 150 and the display 155 described herein with respect to FIGS. 1A-1C.

Still referring to FIG. 2A, the mobility control hardware 220 may be one or more hardware components for controlling movement of the various components of the hitch mounted robot system 100, such as movement and steering of the wheels 115 (FIGS. 1A-1C). Such hardware components may generally be configured to generate and transmit one or more signals to one or more motors coupled to the wheels 115 to effect movement of the wheels 115 (FIGS. 1A-1C) or the like.

The one or more sensors 230 may generally include the various sensors described herein, including the sensors included within the sensor array 170 (FIGS. 1A-1B) and/or the sensing device 142 (FIGS. 1B-1C). The sensors 230 may receive sensed information and transmit signals and/or data corresponding to the sensed information to one or more components described herein. For example, the sensors 230 may receive images and/or image data via the sensing device 142 (FIGS. 1B-1C) and generate one or more signals and/or data to transmit to the processing device 205 for processing the data and determining control of the hitch mounted robot system 100 for maneuvering the hitch mounted robot system 100 into a hitch receiver, as described in greater detail herein.

The height control hardware 260 may generally include one or more components for controlling movement of the height adjustment mechanism 145 (FIGS. 1B-1C), such as an upward and downward movement thereof. Such hardware may transmit signals to the height adjustment mechanism 145 (FIGS. 1B-1C), which moves accordingly.

Figure 2B:
FIG. 2B schematically depicts an illustrative memory component containing illustrative logic components according to one or more embodiments shown and described herein.

The program instructions contained on the memory component 240 (including the RAM 242 and the ROM 244) may be embodied as a plurality of software modules, where each module provides programming instructions for completing one or more tasks. For example, FIG. 2B schematically depicts the memory component 240 containing illustrative logic components according to one or more embodiments shown and described herein. As shown in FIG. 2B, the memory component 240 may be configured to store various processing logic, such as, for example, operating logic 280, user interface (UI) logic 282, navigation logic 284, shopping logic 286, and/or communication logic 288 (each of which may be embodied as a computer program, firmware, or hardware, as an example). The operating logic 280 may include an operating system and/or other software for managing components of the hitch mounted robot system 100 (FIG. 2A). The UI logic 282 may include one or more programming instructions for providing a user interface to a user and receiving commands from the user. The navigation logic 284 may include one or more programming instructions for directing movement of the hitch mounted robot system 100, including autonomous and semiautonomous movement around a space, alignment and insertion into a hitch receiver, and/or the like, as described in greater detail herein. The shopping logic 286 may include one or more programming instructions for facilitating purchase of items that are placed in the upper storage compartment 120 and/or the lower storage compartment 130 (FIGS. 1A-1B), including recognizing the objects via barcode scanning, radio frequency (RF) identification, optical imaging, and/or the like; receiving a user's payment information; locking or unlocking compartments for retrieval of purchased items; and/or the like.

Figure 2C:
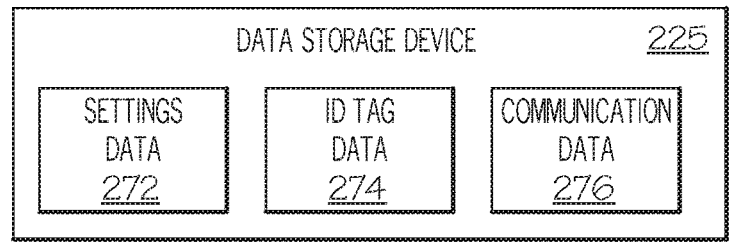
FIG. 2C schematically depicts an illustrative data storage device containing illustrative data components according to one or more embodiments shown and described herein.

FIG. 2C schematically depicts a block diagram of various data contained within a storage device (e.g., the data storage device 225) of a computing device and/or a vehicle component according to one or more embodiments shown and described herein. As shown in FIG. 2C, the data storage device 225 may include, for example, settings data 272, ID tag data 274, and/or communication data 276. Settings data 272 may include, for example, data associated with particular user settings for the hitch mounted robot system 100, such as UI preferences settings, control preferences settings, and/or the like. ID tag data 274 may generally refer to a database of information relating to items that may be placed into and/or removed from the upper storage compartment 120 and/or the lower storage compartment 130 (FIGS. 1A-1B), such as, for example, reference tables that match a barcode or RFID tag to a particular item. Communication data 276 may generally be data that corresponds to communications between the hitch mounted robot system 100 and the vehicle to which the hitch mounted robot system 100 is mounted or can be mounted, such as, for example, image data corresponding to a particular vehicle such that the vehicle can be recognized, QR code data for recognizing a vehicle (as described herein), data that is communicated between a vehicle and the hitch mounted robot system 100 (e.g., handshake data) via the coupling mechanism 140 (FIGS. 1B-1C), and/or the like.

It should be understood that the components illustrated in FIGS. 2A-2C are merely illustrative and are not intended to limit the scope of this disclosure. More specifically, while the components in FIGS. 2A-2C are illustrated as residing within the hitch mounted robot system 100, this is a non-limiting example. In some embodiments, one or more of the components may reside external to the hitch mounted robot system 100.

As mentioned above, the various components described with respect to FIGS. 2A-2C may be used to carry out one or more processes and/or provide functionality for moving the hitch mounted robot system 100, for guiding the hitch mounted robot system 100 into a hitch receiver of a vehicle, for cataloging items placed within storage compartments, for monitoring removal of items from storage compartments, for receiving user inputs, and for providing payment services for a user. An illustrative example of the various processes are described with respect to FIGS. 5-9 hereinbelow.

Figure 3A:
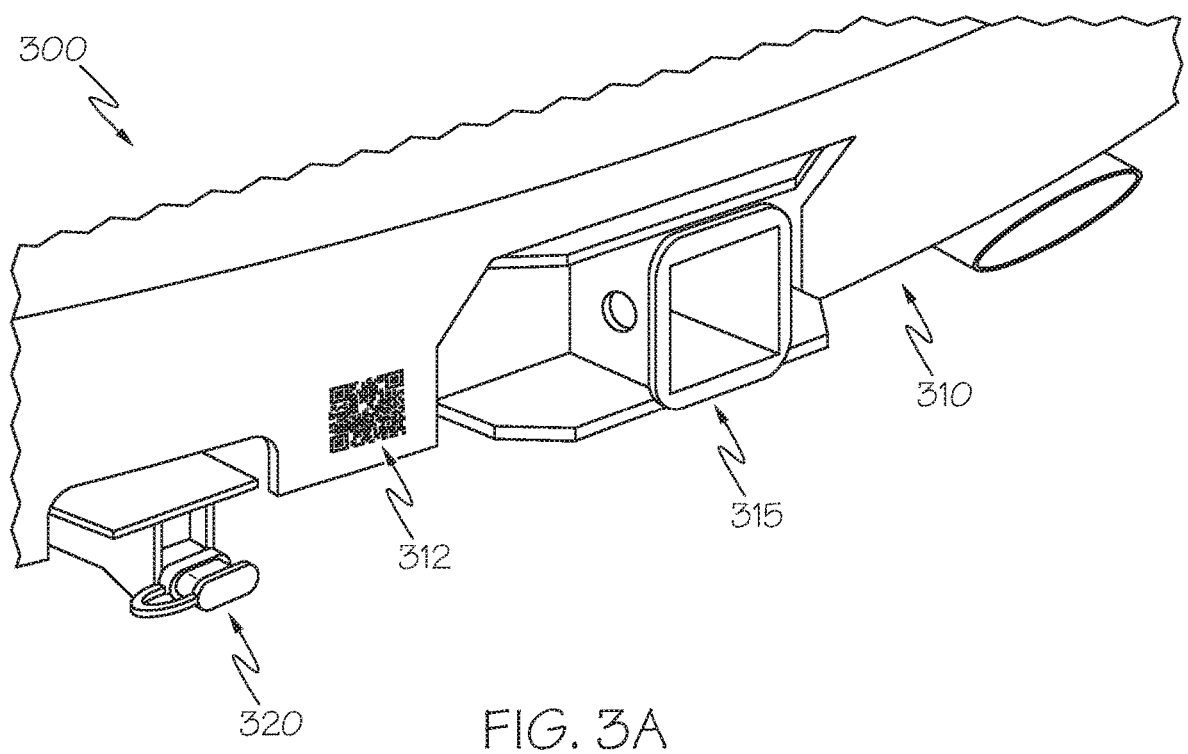
FIG. 3A depicts a detailed perspective view of an illustrative vehicle hitch for receiving a hitch mounted robot system according to one or more embodiments shown and described herein.

Turning now to FIG. 3A, a rear 310 of a vehicle 300 is depicted. The vehicle 300 may generally be any vehicle that is configured for receiving and transporting the hitch mounted robot system 100 (FIGS. 1A-1C) according to the embodiments described herein. The vehicle 300 may generally have a hitch receiver 315. In some embodiments, the vehicle 300 may be any vehicle that has a standard hitch receiver. In other embodiments, the vehicle 300 may be a vehicle that is particularly configured to receive the hitch mounted robot system 100, as described in further detail herein. In both embodiments, the hitch mounted robot system 100 may be coupled to the vehicle 300. As such, the hitch mounted robot system 100 can couple to any vehicle, regardless of whether the vehicle is the user's primary vehicle. This may be particularly useful in instances where the user may not have his/her personal vehicle and/or utilizes a different vehicle other than his/her own for transporting the hitch mounted robot system 100, such as a taxi, a livery vehicle, a ride-sharing or ride-hailing vehicle owned and/or operated by another person, a public transit vehicle, and the like.

In some embodiments, the vehicle 300 may further include an identifier 312 located thereon. The identifier 312 may generally provide specific details that allow the hitch mounted robot system 100 (FIGS. 1A-1C) to recognize the vehicle. Such an identifier 312 may generally be present only on a user's own vehicle for which the hitch mounted robot system 100 (FIGS. 1A-1C) is typically mounted, and may not be present on other vehicles described above. While FIG. 3A depicts the identifier 312 as a QR code, this is merely illustrative. Other identifying components may also be used, such as, without limitation, images, shapes, RFID tags, and/or the like.

Figure 3B:
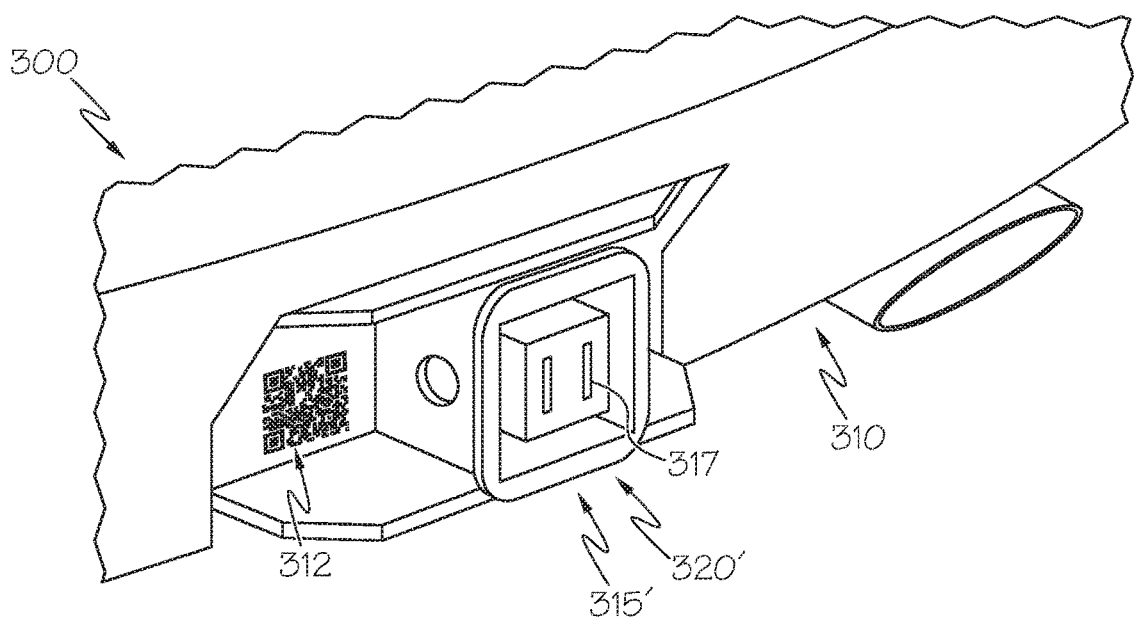
FIG. 3B depicts a detailed perspective view of another illustrative vehicle hitch for receiving a hitch mounted robot system according to one or more embodiments shown and described herein.

In some embodiments, the vehicle 300 may further include an interface 320 that allows for communications between the hitch mounted robot system 100 and one or more vehicle components and/or allows for the hitch mounted robot system 100 to receive electrical power from the vehicle 300. For example, as shown in FIG. 3A, the interface 320 may be a harness-style interface that is separate from the hitch receiver 315. A plug (not shown) extending from the hitch mounted robot system 100 (FIGS. 1A-1C) may be plugged into the interface 320 once the hitch mounted robot system 100 is installed on the hitch receiver 315. It should be understood that such a harness-style interface 320 is separate from a trailer hitch harness, which may not be capable of providing continuous power or capable of transferring data. In another example, an alternative interface 320' may be a modified hitch receiver 315' that includes one or more interface components 317 integrated therewith, as shown in FIG. 3B. As such, when the coupling mechanism 140 of the hitch mounted robot system 100 (FIGS. 1A-1C) is coupled to the modified hitch receiver 315', a plug integrated with the coupling mechanism 140 is coupled to the one or more interface components 317 within the modified hitch receiver 315' such that the hitch mounted robot system 100 receives electrical power and/or communicates with the vehicle 300. The interface 320 (FIG. 3A) and the alternative interface 320' (FIG. 3B) may each utilize one or more components to transfer data and/or electricity that are generally understood. Accordingly, such components are not described in further detail herein.

The various components of the vehicle 300 described with respect to FIGS. 3A and 3B and the various components of the hitch mounted robot system 100 described with respect to FIGS. 1A-1C may be collectively used to mate the hitch mounted robot system 100 with the vehicle 300 and lift the hitch mounted robot system 100 off the ground, as depicted in FIGS. 4A-4C.

As shown in FIG. 4A, the hitch mounted robot system 100 is arranged such that the back side 107 thereof is facing the rear 310 of the vehicle 300. The hitch mounted robot system 100 then moves towards the vehicle 300 in the direction of the arrow depicted in FIG. 4A such that the coupling mechanism 140 couples to the hitch receiver 315 (i.e., such that the coupling mechanism 140 is inserted into a distal end 325 of the hitch receiver 315), as depicted in FIG. 4B. The movement depicted in FIG. 4A that results in the coupling depicted in FIG. 4B may be manually completed by a user (e.g., by aligning and pushing the hitch mounted robot system 100 towards the vehicle 300), may be semi-autonomously completed by the hitch mounted robot system 100 and the user (e.g., the user aligns/steers the hitch mounted robot system 100 and the hitch mounted robot system 100 moves backwards towards the vehicle 300), or may be autonomously completed by the hitch mounted robot system 100. In addition, the coupling mechanism 140 may move from a collapsed position to an extended position in some embodiments when moving towards the coupling position depicted in FIG. 4B. When the movement is completed autonomously, the sensing device 142 may sense the vehicle 300, determine that the vehicle 300 is the correct vehicle to which the hitch mounted robot system 100 is to couple, determine the relative location of the hitch receiver 315 and the coupling mechanism 140, and move the hitch mounted robot system 100 and/or various components thereof to cause the coupling mechanism 140 to move into the hitch receiver 315. Additional details regarding this autonomous movement is described herein with respect to FIG. 6.

Once the coupling mechanism 140 is coupled to the hitch receiver 315, the two may be locked together, such as by inserting a pin (not shown) in a receiver locking hole 330 (or via any other locking feature). The receiver locking hole 330 should generally be understood and is not described in further detail herein. In some embodiments, locking the coupling mechanism 140 to the hitch receiver 315 may be completed automatically upon coupling of the coupling mechanism 140 to the hitch receiver 315. Referring to FIG. 4C, once the coupling mechanism 140 is locked to the hitch receiver 315, the height adjustment mechanism 145 may be actuated to raise the hitch mounted robot system 100 off the ground, as indicated by the upwards arrow in FIG. 4C. In some embodiments, lifting the hitch mounted robot system 100 off the ground may be necessary to avoid damage to the hitch mounted robot system 100 when the vehicle is in motion. As such, the hitch mounted robot system 100 may be lifted to a height sufficient to provide a ground clearance to avoid damage.

Figure 5:
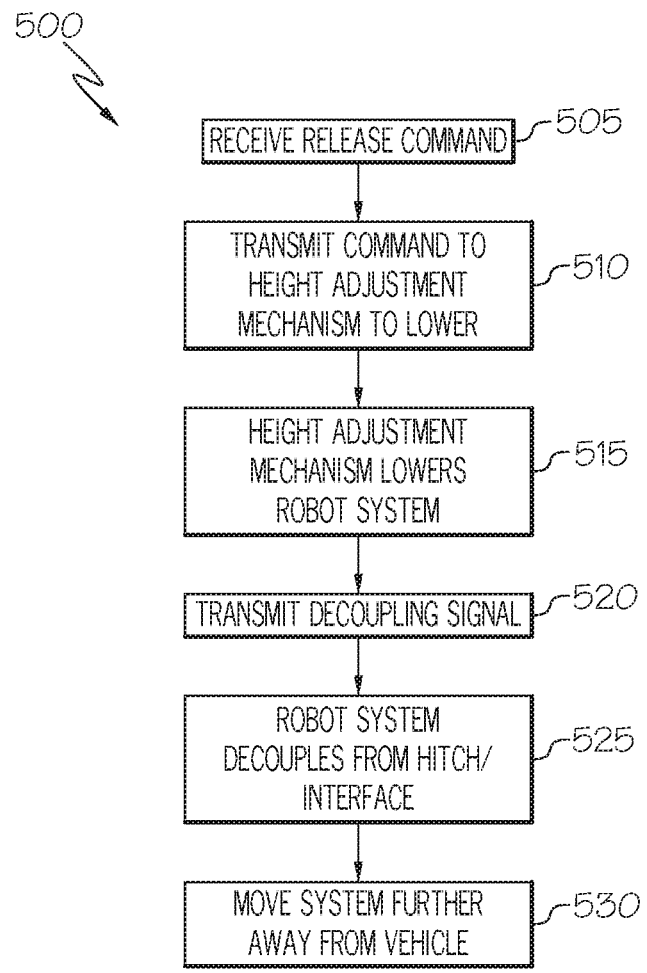
FIG. 5 depicts a flow diagram of an illustrative method of releasing a hitch mounted robot system from a vehicle hitch according to one or more embodiments shown and described herein.

As previously mentioned, FIGS. 5-9 depict various processes that may be completed by the hitch mounted robot system 100 and/or one or more components thereof for autonomous or semiautonomous operation of the hitch mounted robot system 100 (FIGS. 1A-1C). The various processes described with respect to FIGS. 5-9 may generally be completed by the hitch mounted robot system or a component thereof, such as, for example, the processing device 205 (FIG. 2). FIG. 5 depicts an illustrative method of decoupling the hitch mounted robot system from a vehicle, generally designated 500, according to some embodiments. The various steps described with respect to FIG. 5 are merely illustrative, and additional, fewer, or alternative steps are contemplated without departing from the scope of the present disclosure. In addition, the steps described with respect to FIG. 5 are generally completed when the hitch mounted robot system is raised off the ground and the vehicle is parked (i.e., not moving).

At block 505, a release command may be received. The release command may be received via the user interface on the hitch mounted robot system, may be received via a remote control device that transmits a wireless signal to the hitch mounted robot system, and/or may be received from a device within the vehicle that transmits the command via the interface. Upon receiving such a command, a command may then be transmitted to the height adjustment mechanism to lower the hitch mounted robot system onto the ground at block 510.

As a result of receiving the command, the height adjustment mechanism may lower the hitch mounted robot system such that the hitch mounted robot system is placed on the ground at block 515. Thereafter, a signal is transmitted to decouple the hitch mounted robot system from the vehicle at block 520 and/or release the locking mechanism if the coupling mechanism is locked to the hitch receiver. For example, a signal may be transmitted to the drive mechanism (e.g., the one or more motors) to cause the wheels to move forward (i.e., away from the vehicle), thereby causing the hitch mounted robot system to decouple from the vehicle. In another example, a signal may be transmitted to a user interface device such that the user interface device displays a command to a user that instructs the user to pull the hitch mounted robot system away from the vehicle. Accordingly, the hitch mounted robot system decouples from the hitch receiver and/or the interface to separate from the vehicle at block 525. In some embodiments, the sensing device may image the area adjacent to the coupling mechanism and may provide image data that is indicative of whether the coupling mechanism has decoupled from the hitch receiver (e.g., by providing information that is indicative of a separation between the hitch and the receiver). The hitch mounted robot system then moves further away from the vehicle at block 530 such that the hitch mounted robot system can be operated as described herein.

Figure 6:
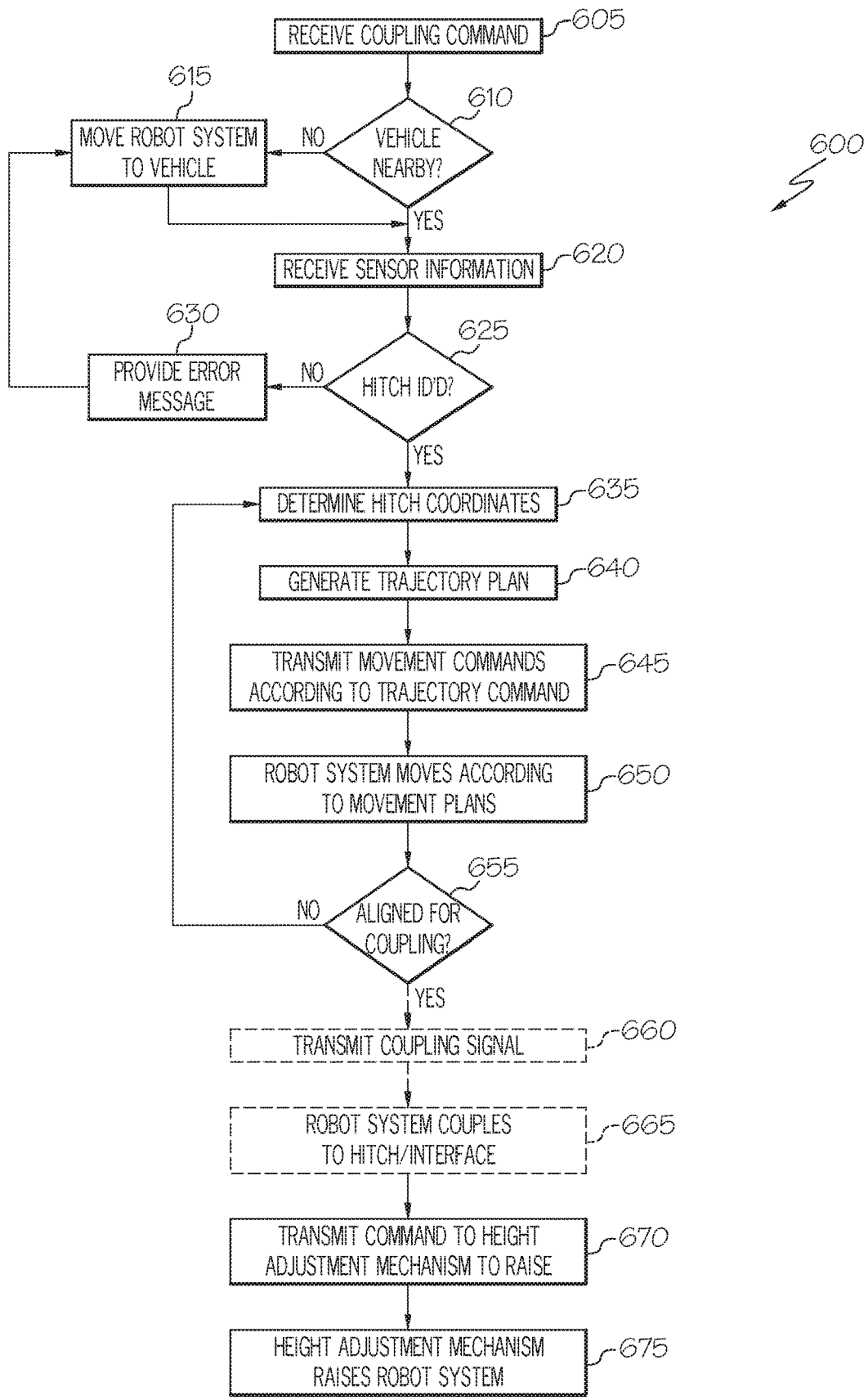
FIG. 6 depicts a flow diagram of an illustrative method of automatically coupling a hitch mounted robot system to a vehicle hitch according to one or more embodiments shown and described herein.

FIG. 6 depicts an illustrative method of coupling the hitch mounted robot system from a vehicle, generally designated 600, according to some embodiments. The various steps described with respect to FIG. 6 are merely illustrative, and additional, fewer, or alternative steps are contemplated without departing from the scope of the present disclosure. In addition, the steps described with respect to FIG. 6 are generally completed when the vehicle is parked (i.e., not moving).

At block 605, a coupling command may be received. The coupling command may be received via the user interface on the hitch mounted robot system, may be received via a remote control device that transmits a wireless signal to the hitch mounted robot system, and/or may be received from a device within the vehicle that transmits the command via the interface. Upon receiving such a command, a determination may be made at block 610 as to whether a vehicle is nearby. Such a determination may generally be completed by analyzing data provided by one or more sensors to determine whether the data is indicative of a vehicle. If no vehicle is nearby, the hitch mounted robot system may be moved toward a vehicle at block 615. This may be completed autonomously, semi-autonomously, or manually, as described herein.

Once the hitch mounted robot system is near a vehicle (as determined by the data received from one or more sensors), additional sensor information may be received at block 620. Such additional sensor information may generally be data corresponding to one or more images obtained by the various sensors to determine at block 625 whether the vehicle adjacent to the hitch mounted robot system is a vehicle containing a hitch receiver (i.e., whether a hitch has been identified). In some embodiments, the determination at block 625 may also include determining whether an identifier such as a QR code, RFID tag, or the like is present on the vehicle, where the identifier specifically identifies the vehicle. In some embodiments, the determination at block 625 may be completed using an object recognition algorithm, such as a commercially available object recognition algorithm that is particularly configured to program a processing device to recognize vehicles, components thereof, and/or features thereof. If the vehicle does not contain a hitch receiver or if the received data does not correspond to a vehicle containing a hitch receiver (e.g., if the sensors are unable to sense a rear of the vehicle), an error message may be provided at block 630. For example, the user interface may display a message to the user that states "NO VEHICLE HITCH FOUND" or the like. In some embodiments, the user may reposition the hitch mounted robot system and provide an input to restart the process.

If a hitch is identified, the coordinates of the hitch with respect to the hitch mounted robot system (and more specifically, the coupling mechanism thereof) may be determined at block 635 and a trajectory plan for guiding the coupling mechanism of the hitch mounted robot system into the hitch receiver of the vehicle may be determined at block 640. At block 645, one or more commands may be transmitted, the commands corresponding to the trajectory plan. The commands may generally be transmitted to the one or more motors and/or steering mechanisms to drive movement of the wheels of the hitch mounted robot system. At block 650, the hitch mounted robot system may move in accordance with the commands.

Periodically, the hitch mounted robot system may verify that it is accurately moving as planned so as to align the coupling mechanism with the hitch receiver on the vehicle. As such, a determination may be made at block 655 as to whether the hitch mounted robot system remains aligned for coupling. If not, the process may repeat at block 635. Otherwise, the hitch mounted robot system may move such that the coupling mechanism thereof slides into the hitch receiver of the vehicle. Upon insertion, a coupling signal may be transmitted at block 660. The coupling signal may be, for example, a command to couple the hitch mounted robot system to the interface to allow for vehicle-hitch mounted robot system communications, a command provided by the user interface that directs the user to plug the hitch mounted robot system into the corresponding vehicle communications port, or the like. As such, the hitch mounted robot system may communicatively and/or electrically couple to the vehicle at block 665 (e.g., establish a communications link and/or an electrical power link between the vehicle and the hitch mounted robot system via the interface). It should be understood that the steps according to blocks 660 and 665 are optional (as indicated by the dashed lines) and need not be completed, particularly in instances where the hitch mounted robot system is being coupled to a vehicle other than a particularly configured vehicle (e.g., a taxi, a livery car, a ride share vehicle, or the like), as described herein.

At block 670, a command may be transmitted to the height adjustment mechanism to raise the hitch mounted robot system off the ground. Accordingly the height adjustment mechanism may actuate and raise the hitch mounted robot system off the ground at block 675 such that the hitch mounted robot system is ready for transport by the vehicle.

While not specifically described in FIG. 6, the hitch mounted robot system may also be locked to the vehicle (e.g., via the receiver locking hole) at any time after the coupling mechanism is received within the hitch receiver. Such a locking may be completed manually by a user or automatically by one or more components of the hitch mounted robot system. Such a locking process may also avoid an accidental decoupling of the hitch mounted robot system from the vehicle at an unintended time (e.g., during transport).

Figure 7:
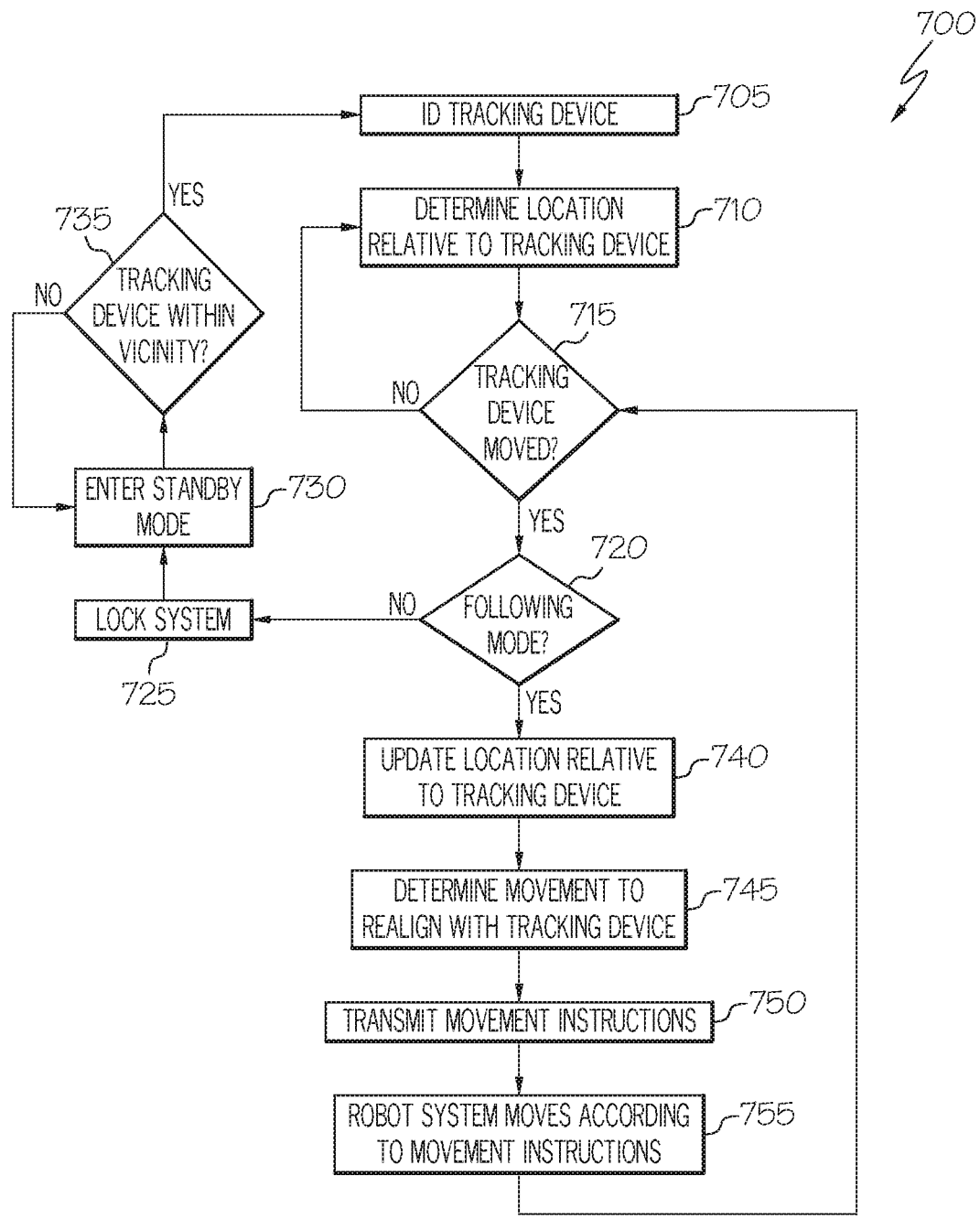
FIG. 7 depicts a flow diagram of an illustrative method employed by a hitch mounted robot system when following a user around a space according to one or more embodiments shown and described herein.

FIG. 7 depicts an illustrative method employed by the hitch mounted robot system for autonomously maintaining a position relative to a user, generally designated 700, according to some embodiments. The various steps described with respect to FIG. 7 are merely illustrative, and additional, fewer, or alternative steps are contemplated without departing from the scope of the present disclosure. In addition, the steps described with respect to FIG. 7 may be replaced with steps that are generally understood processes for autonomous robotic systems without departing from the scope of the present disclosure.

At block 705, a tracking device associated with a user to be tracked may be identified. The tracking device is not limited by this disclosure, and may be any generally recognized tracking device. For example, the tracking device may be a remote control device for the hitch mounted robot system that is equipped with one or more radios that can be used for communication between the remote and the hitch mounted robot system. In another example, the tracking device may be the user's mobile phone or the like. In yet another example, the tracking device may be an identifying feature located on the user that is capable of being visually recognized and monitored by one or more components of the hitch mounted robot system. In still another example, the tracking device may be a tethered component that is held by the user and/or clipped to the user and extends to the hitch mounted robot system.

At block 710, the location of the hitch mounted robot system may be determined relative to the tracking device to monitor whether the tracking device (and thus the user) has moved outside a predefined space adjacent to the hitch mounted robot system. As such, a determination may be made at block 715 if the tracking device has moved relative to the hitch mounted robot system. If not, the process may return to block 710. If so, another determination may be made at block 720 as to whether the hitch mounted robot system is in a following mode whereby the hitch mounted robot system follows a user around a space. If not, the hitch mounted robot system may be locked at block 725 and may enter a standby mode at block 730 until the tracking device again moves within a vicinity of the hitch mounted robot system. As such, a determination is made at block 735 whether the tracking device has moved within the vicinity. If not, the process may repeat at block 730. If so, the process may repeat at block 705.

If the hitch mounted robot system is in the following mode, the location of the hitch mounted robot system relative to the tracking device may be updated at block 740 and a determination as to what movements are necessary to ensure the hitch mounted robot system again moves within the vicinity of the tracking device may be completed at block 745. Movement instructions may then be transmitted to one or more components of the hitch mounted robot system, such as to motors, wheels, or the like at block 750 such that the hitch mounted robot system moves accordingly at block 755. Thereafter, the process may return to block 715.

Figure 8:
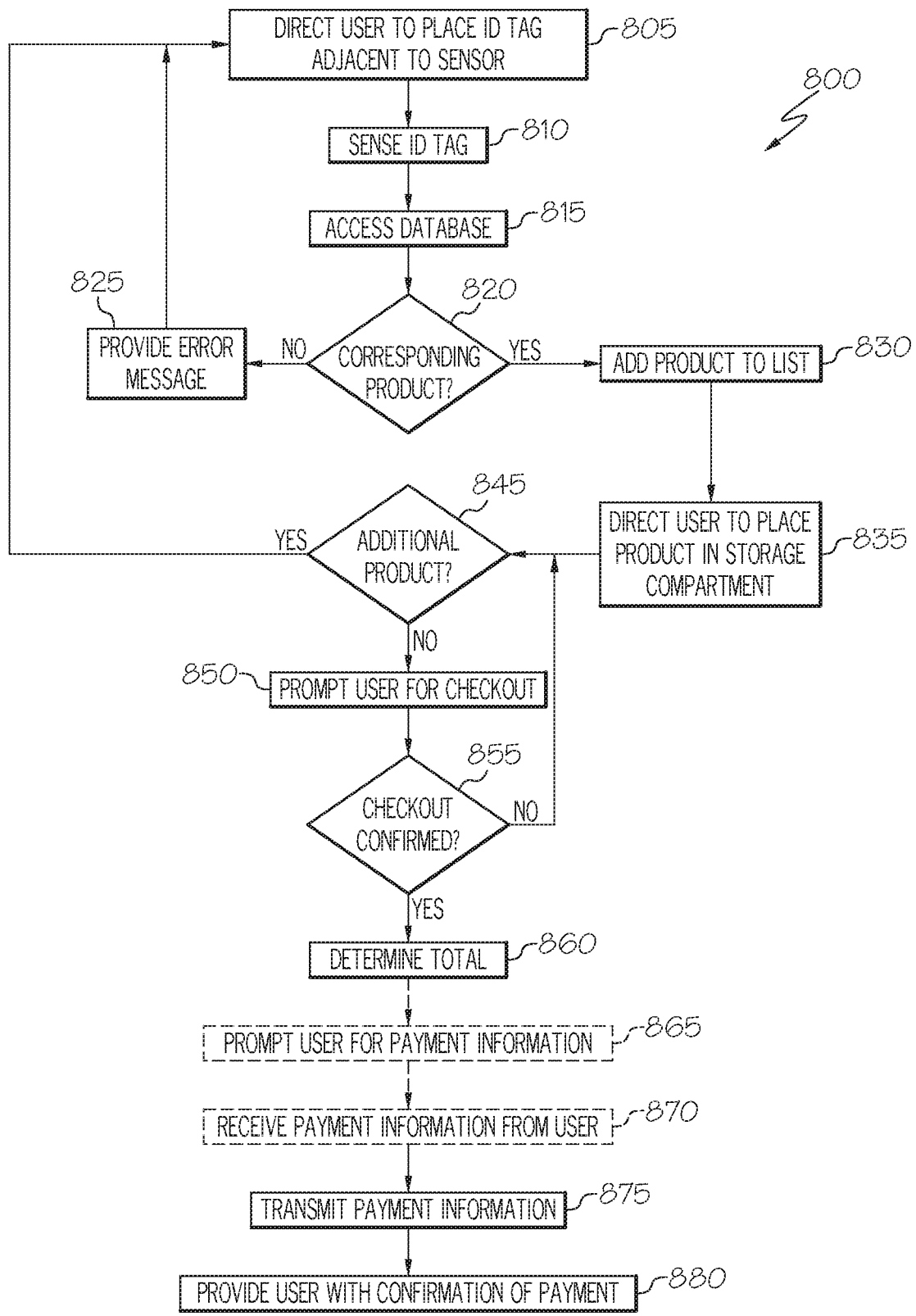
FIG. 8 depicts a flow diagram of an illustrative method employed by a hitch mounted robot system for purchasing items deposited in the hitch mounted robot system according to one or more embodiments shown and described herein.

FIG. 8 depicts an illustrative method employed by the hitch mounted robot system for assisting a user in purchasing items, generally designated 800, according to some embodiments. The various steps described with respect to FIG. 8 are merely illustrative, and additional, fewer, or alternative steps are contemplated without departing from the scope of the present disclosure. In addition, the steps described with respect to FIG. 8 may be replaced with steps that are generally understood processes for providing an interface for purchasing items without departing from the scope of the present disclosure.

At block 805, the user may be directed (e.g., via the user interface) to place an identification tag adjacent to a sensor of the hitch mounted robot system such that the identification tag can be sensed at block 810 and a database can be accessed at block 815 to determine whether the identification tag corresponds to a particular product at block 820. The identification tag is not limited by this disclosure, and may be any identification tag. Examples of identification tags include barcodes, QR codes, radio frequency identification (RFID) tags, and the like. If a corresponding product is not determined as a result of block 820, an error message may be provided to the user (e.g., via the user interface) at block 825 and the process may return to block 805. If a corresponding product is discovered, the product may be added to purchase list at block 830. In some embodiments, the user may further be prompted to select a quantity of the same item to facilitate ease and/or speed of use. That is, if a user desires to purchase a plurality of the same item, the user may scan an identification tag of one of the plurality and enter a quantity via the user input. In some embodiments, the user may then be directed (e.g., via the user interface) to place the item in a storage compartment of the hitch mounted robot system at block 835.

The above-mentioned processes may be completed for each product a user wishes to purchase. As such, at block 845 a determination is made as to whether additional products are to be scanned. Such a determination may be completed by receiving a user input indicative of additional products to be scanned or a failure to receive an input from a user indicating that the user wishes to check out. If additional products are to be added, the process may repeat at block 805. If not additional products are to be added, the process may proceed to block 850.

At block 850, the user may be prompted as to whether he/she desires to check out and pay for the items. As such, a determination may be made at block 855 as to whether the user confirms he/she is ready to check out. If the user does not provide a confirmation, the process may return to block 845 to determine whether additional products are to be purchased. If the user does provide a confirmation, a total amount to be paid may be determined at block 860.

Optionally, at block 865, the user may be prompted for payment information, which may subsequently be provided at block 870. Such steps are optional because in some embodiments, the user may have pre-stored payment information. As such, payment information need not be provided again by the user.

At block 875, the payment information may be transmitted. For example, payment may be transmitted to a merchant, a bank, a clearinghouse, and/or the like. The user may then be provided with confirmation of payment at block 880, such as a receipt or the like.

Figure 9:
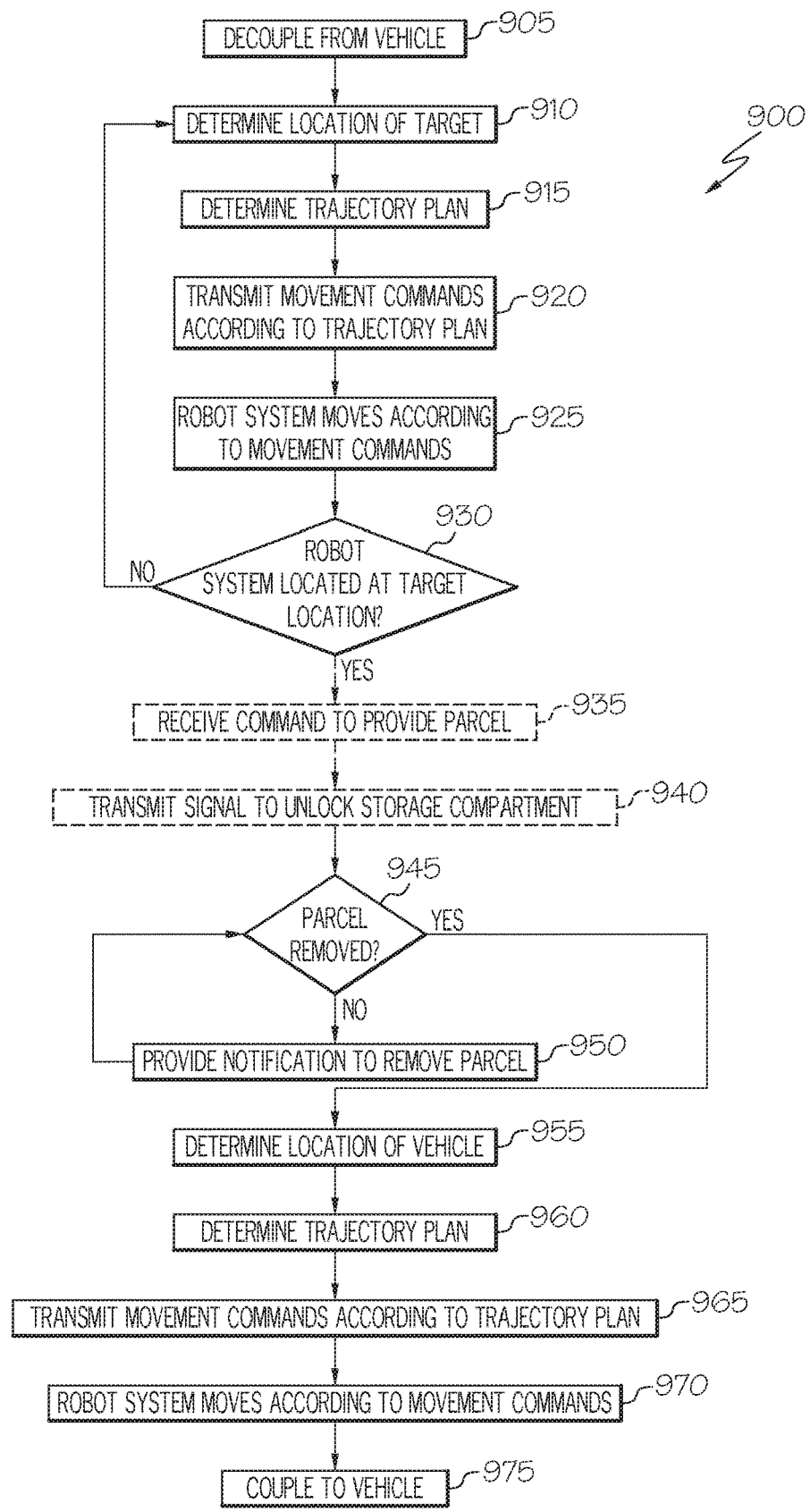
FIG. 9 depicts a flow diagram of an illustrative method employed by a hitch mounted robot system for providing last mile delivery services according to one or more embodiments shown and described herein.

As previously described herein, the hitch mounted robot system may be used for a plurality of different purposes. For example, in some embodiments, the hitch mounted robot system may be used to provide "last mile" delivery of packages. FIG. 9 depicts an illustrative method employed by the hitch mounted robot system for providing "last mile" delivery, generally designated 900, according to some embodiments. The various steps described with respect to FIG. 9 are merely illustrative, and additional, fewer, or alternative steps are contemplated without departing from the scope of the present disclosure.

At block 905, the hitch mounted robot system may decouple from the vehicle, such as by completing the decoupling steps described herein with respect to FIG. 5. Still referring to FIG. 9, the location of a target destination may be determined at block 910 and a trajectory plan (e.g., a mapped route) may be determined at block 915. Such a trajectory plan may be determined based on topography, objects that may hinder movement of the hitch mounted robot system, terrain, presence of stairs, and/or the like. At block 920, movement commands may be transmitted to one or more components of the hitch mounted robot system (e.g., to one or more motors or the like) to cause the hitch mounted robot system to move accordingly at block 925.

At block 930, a determination may be made as to whether the hitch mounted robot system is located at the target location. If not, the process may repeat at block 910. If so, the process may proceed to block 935 (or alternatively, block 945).

At block 935, the hitch mounted robot system may receive a command to provide the parcel. Such a command may come from a remote server, from a user, or the like. In some embodiments, the source of the command may be authenticated to ensure that the parcel is being provided to the correct person. Upon receiving the command, a signal may be transmitted at block 940 to unlock the storage compartment such that the parcel can be retrieved.

At block 945, a determination may be made as to whether the parcel has been removed. If not, the process may proceed to block 950. If so, the process may proceed to block 955.

At block 950, a notification may be provided to a user to remove the parcel. For example, a notification may be displayed on the user interface. The process may then return to block 945.

At block 955, the location of the vehicle relative to the hitch mounted robot system may be determined. As described in greater detail herein, the trajectory plan for moving the hitch mounted robot system back to the vehicle may be determined at block 960 and the various movement commands to the components of the hitch mounted robot system may be transmitted at block 965 such that the hitch mounted robot system moves accordingly at block 970. At block 975, the hitch mounted robot system may be coupled to the vehicle. For example, the processes described herein with respect to FIG. 6 may be completed to couple the hitch mounted robot system to the vehicle.

It should now be understood that the robot systems described herein are configured to be mounted to standard and/or customized trailer hitches on vehicles such that the robot systems can be transported by the vehicles. The robot systems described herein generally include various components that couple/decouple the robot systems from a standard vehicle hitch receiver, as well as various components that allow for charging and/or communications via a modified vehicle hitch or a vehicle hitch having a particular communications/power interface.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hitch mounted robot system, comprising:
   a coupling mechanism insertable into a hitch receiver;

a height adjustment mechanism coupled to the coupling mechanism, wherein the height adjustment mechanism automatically moves the coupling mechanism in a system vertical direction to lift the system off a ground surface when the coupling mechanism is inserted into the hitch receiver;

a drive mechanism driving movement of one or more wheels coupled to the drive mechanism;

a sensor array that senses an area surrounding the system; and a processing device communicatively coupled to the sensor array and the drive mechanism and configured to:

determine one or more movement commands from data received from the sensor array, and transmit one or more signals corresponding to the one or more movement commands to the drive mechanism to cause the one or more wheels to move.

2. The hitch mounted robot system of claim 1, further comprising a sensing device that senses an area adjacent to the coupling mechanism and provides data corresponding to the area.

3. The hitch mounted robot system of claim 2, wherein the data is usable to guide the coupling mechanism into the hitch receiver.

4. The hitch mounted robot system of claim 1, wherein the coupling mechanism comprises one or more communications connectors that facilitate electronic communication between the hitch mounted robot system and the vehicle when the coupling mechanism is inserted into the hitch receiver.

5. The hitch mounted robot system of claim 1, wherein the height adjustment mechanism comprises one or more of a chain drive mechanism, a belt drive mechanism, a hydraulic lift, a pneumatic lift, a lead screw, a plurality of mechanical linkages, and a ribbon lift.

6. The hitch mounted robot system of claim 1, wherein the processing device is configured to identify a tracking device and provide the one or more signals corresponding to the one or more movement commands to the drive mechanism to maintain a positioning of the hitch mounted robot system relative to the tracking device.

7. The hitch mounted robot system of claim 1, further comprising at least one storage compartment having a cavity, the storage compartment supported by the one or more wheels.

8. The hitch mounted robot system of claim 1, further comprising a user interface device having a display, the user interface device communicatively coupled to the processing device and configured to receive one or more inputs from a user.

9. The hitch mounted robot system of claim 8, wherein the user interface device is further configured to assist the user in purchasing items.

10. A hitch mounted robot system mounted to a vehicle, the hitch mounted robot system comprising:

a coupling mechanism;

a height adjustment mechanism coupled to the coupling mechanism;

one or more wheels;

a drive mechanism coupled to the one or more wheels to drive movement of the one or more wheels;

a sensor array that senses an area surrounding the system;

a processing device communicatively coupled to the sensor array, the height adjustment mechanism, and the drive mechanism; and a non-transitory, processor-readable storage medium communicatively coupled to the processing device, the non-transitory, processor-readable storage medium comprising one or more programming instructions stored thereon that, when executed by the processing device, cause the processing device to:

determine coordinates of a trailer hitch receiver relative to the coupling mechanism from data received from the sensor array, generate a trajectory plan that corresponds to one or more movements for guiding the coupling mechanism into the trailer hitch receiver, transmit one or more movement commands to the drive mechanism, wherein the one or more movement commands correspond to the trajectory plan to cause the wheels to move and guide the coupling mechanism into the trailer hitch receiver, and when the coupling mechanism is inserted into the trailer hitch receiver, transmit a signal to the height adjustment mechanism to cause the height adjustment mechanism to raise the coupling mechanism to lift the hitch mounted robot system off a ground surface.

11. The hitch mounted robot system of claim 10, further comprising a sensing device, wherein the one or more programming instructions that, when executed, cause the processing device to determine the coordinates of the trailer hitch receiver further cause the processing device to receive image data from the sensing device, the image data containing one or more images of the trailer hitch receiver.

12. The hitch mounted robot system of claim 10, wherein the one or more programming instructions, when executed, further cause the processing device to receive a coupling command prior to determining the coordinates of the trailer hitch receiver.

13. The hitch mounted robot system of claim 10, wherein the one or more programming instructions, when executed, further cause the processing device to determine whether the vehicle having the trailer hitch receiver is within a vicinity of the hitch mounted robot system prior to determining the coordinates of the trailer hitch receiver.

14. The hitch mounted robot system of claim 13, wherein when no vehicle is detected within the vicinity of the hitch mounted robot system, the one or more programming instructions, when executed, further cause the processing device to transmit one or more commands for moving the hitch mounted robot system towards a target vehicle.

15. The hitch mounted robot system of claim 10, wherein the one or more programming instructions that, when executed, cause the processing device to determine the coordinates of the trailer hitch receiver further cause the processing device to identify the trailer hitch receiver via an identifier located on the vehicle.

16. The hitch mounted robot system of claim 10, wherein the one or more programming instructions, when executed, further cause the processing device to establish a communications link via an interface between the vehicle and the hitch mounted robot system.

17. The hitch mounted robot system of claim 10, wherein the one or more programming instructions, when executed, further cause the processing device to establish an electrical power link via an interface between the vehicle and the hitch mounted robot system.

18. A hitch mounted robot system mounted to a vehicle, the hitch mounted robot system comprising:

a coupling mechanism;

a height adjustment mechanism coupled to the coupling mechanism;

one or more wheels;

a drive mechanism coupled to the one or more wheels to drive movement of the one or more wheels;

a sensor array that senses an area surrounding the system;

a processing device communicatively coupled to the sensor array, the height adjustment mechanism, and the drive mechanism; and a non-transitory, processor-readable storage medium communicatively coupled to the processing device, the non-transitory, processor-readable storage medium comprising one or more programming instructions stored thereon that, when executed by the processing device, cause the processing device to:

transmit a command to the height adjustment mechanism to cause the height adjustment mechanism to lower the coupling mechanism such that the hitch mounted robot system contacts a ground surface, determine one or more movement commands from data received from the sensor array, and transmit one or more signals to the drive mechanism corresponding to the movement commands to cause the drive mechanism to drive the one or more wheels in a direction away from the vehicle such that the hitch mounted robot system decouples from the vehicle.

19. The hitch mounted robot system of claim 18, wherein the one or more programming instructions further cause the processing device to:

receive the data from the sensor array, wherein the data corresponds to an imaged area adjacent to the coupling mechanism; and determine, based on the data, that the hitch mounted robot system is decoupled from the vehicle when the data contains image information indicative of a separation between the coupling mechanism and a hitch receiver of the vehicle.

\* \* \* \* \*